United States Patent [19]

Murata et al.

[11] Patent Number: 4,954,847
[45] Date of Patent: Sep. 4, 1990

[54] RECIRCULATING AUTOMATIC DOCUMENT FEEDER

[75] Inventors: Kazushige Murata; Mitsuru Nagoshi, both of Hachioji, Japan

[73] Assignee: Konica Corporation, Tokyo, Japan

[21] Appl. No.: 196,122

[22] Filed: May 19, 1988

[30] Foreign Application Priority Data

| May 22, 1987 | [JP] | Japan | 62-126751 |
| May 22, 1987 | [JP] | Japan | 62-126756 |
| May 22, 1987 | [JP] | Japan | 62-126757 |
| May 22, 1987 | [JP] | Japan | 62-126762 |
| May 22, 1987 | [JP] | Japan | 62-77788 |

[51] Int. Cl.⁵ ............................................. G03G 15/00
[52] U.S. Cl. ..................................... 355/318; 271/3.1; 271/301
[58] Field of Search ............... 355/224, 230, 234, 308, 355/318, 319, 320, 321, 23-25, 317, 75; 271/3.1, 225, 65, 291, 301, 902, 3

[56] References Cited

U.S. PATENT DOCUMENTS

| 4,146,219 | 3/1979 | Phillips | 271/902 X |
| 4,176,945 | 12/1979 | Holzhauser et al. | 355/318 X |
| 4,234,180 | 11/1980 | Looney | 271/902 X |
| 4,238,126 | 12/1980 | Langdon | 271/3.1 |
| 4,278,344 | 7/1981 | Sahay | 355/23 X |
| 4,368,973 | 1/1983 | Silverberg | 271/3.1 X |
| 4,470,591 | 9/1984 | Acquaviva | 355/75 X |
| 4,553,828 | 11/1985 | Burger et al. | 355/318 |
| 4,744,553 | 5/1988 | Hirose | 355/23 X |

FOREIGN PATENT DOCUMENTS 0029647 3/1981 European Pat. Off. .
0078680 11/1983 European Pat. Off. .

OTHER PUBLICATIONS

Joseph A. Swift et al.; "Static Eliminator Brush Structure"; Xerox Disclosure Journal; vol. 10, No. 2, Mar.-/Apr., 1985; p. 109.

Primary Examiner—Joan H. Pendegrass
Attorney, Agent, or Firm—Jordan B. Bierman

[57] ABSTRACT

The invention provides a sheet conveyance apparatus for conveying an original document sheet onto a platen glass through which the sheet is irradiated by light. The sheet conveyance apparatus having a driving means capable of moving conveyor belt in both directions so that, by moving the conveyor belt to the first-moving direction, the sheet is fed onto through the first side and carried away from through the second side of the platen glass. A delivery tray is mounted above the platen glass so that the sheet is delivered through first turning passage from the second side of the platen glass to the delivery tray. Between the conveyor belt and the delivery tray is provided a second turning passage so that the sheet is returned through the second turning passage from the first turning passage to the second side of the platen glass.

14 Claims, 33 Drawing Sheets

RECIRCULATING AUTOMATIC DOCUMENT FEEDER

BACKGROUND OF THE INVENTION

The present invention relates to a sheet conveyance apparatus for use in a copier; in particular, an automatic sheet conveyance apparatus provided with a sheet reversing device.

Hitherto, there has been provided a sheet conveyance apparatus which is so configured that an original document sheet is led onto sheet glass by means of a conveyor belt that can run across both directions over the sheet glass, then the sheet is conveyed reversely to cause its trailing edge to come in contact with a stepped portion of a stopper plate installed at the end of the sheet glass. In the sheet conveyance apparatus, when feeding a sheet from a sheet supply section, between the conveyor belt and the stepped stopper plate at the sheet glass end, there is provided a gap for sheet passage, while reversely conveying the sheet so as to cause it to come in contact with the stepped stopper plate, the above part is so constituted to make the gap close. In the sheet conveyance apparatus disclosed in Japanese Patent Publication Open to Public Inspection (hereinafter called Japanese Patent O.P.I. Publication) No. 21762-1983, a belt keep roller is supported by a shaft disposing on the moving end of a vertically movable lever which can rock around a fulcrum formed by a drive roller shaft of a conveyor belt, and the moving end of the lever is biased downward so that the belt keep roller is moved upward against the spring when the conveyor belt runs in normal direction and the belt keep roller is moved downward by means of spring force when the conveyor belt runs in reverse direction.

In the above sheet conveyance apparatus, however, its mechanism is complicated, as well as the position of installing the belt keep roller depends indispensably on relative conditions between the drive roller shaft of the conveyor belt and the stepped stopper plate; the above functions cannot be sufficiently achieved, if such position is not set accurately. In addition, if the force of the spring which pushes the belt keep roller downward is too strong, this makes it difficult to provide the gap when the conveyor belt runs in normal direction and, if such force is too weak, this reduces the effect of closing the gap; therefore, adjustment of the spring force is difficult.

Aiming at solving the above problems, there inventors disclosed a new sheet conveyance apparatus in Japanese Patent O.P.I. Publication, No. 229741-1986: Sheet conveyance apparatus is so configured that, a sheet, after it has been led onto sheet glass by means of a conveyor belt capable of running in both directions over the sheet glass, is conveyed reversely to cause its trailing edge to come in contact with a stepped stopper plate provided at the sheet glass end, and is characterized in that a belt keep roller movable interlockingly with the normal and reverse movement of the conveyor belt is provided near the stepped stopper plate.

In the sheet conveyance apparatus, during sheet conveyance by the reverse movement of the conveyor belt, since the belt keep roller continuously presses the stepped stopper plate via the belt, the continuous pressure contact increases the rotating load of the conveyor belt and causes improper rotation; further, the conveyor belt is worn frictionally by the stepped stopper plate, which may result in breakage of the conveyor belt.

As apparatus which can supply efficiently and automatically original sheets to be copied, automated document feeder (hereinafter called the ADF) is available. Hitherto, its function has been limited to copying only one side of a sheet.

In an aspect, lately, a recording apparatus has been developed which is capable of copying both sides of recording paper; this has increasingly required a reversible automatic document feeder (hereinafter called the RADF) that can copy both sides of an original document sheet. Many features that reverse a sheet in the RADF have been proposed. This proposal has been disclosed in Japanese Patent O.P.I. Publication Nos. 216159/1984, 112738/1978 and 8834/1985, Japanese Utility Model O.P.I. Publication No. 4548/1984, and Japanese Patent Application No. 146188/1985.

In such RADF, sheets mounted on a sheet supply tray are sent out one by one by a sheet supply section, and the sent out sheet is fed on sheet glass by the forward running of a conveyor belt and stops at a predetermined position. Then, the side A (obverse) of a sheet is scanned and subjected to light, leading to the formation of copied images on recording paper.

The sheet, whose side A has undergone the copying process, is moved away from the sheet glass by the forward running of the conveyor belt and fed to a paper ejection inversion unit.

Next, when the side B (back) of the sheet is copied, the sheet is inverted in the paper ejection inversion unit and its top end is led again onto the sheet glass. Then, the drive roller has been switched to backward running by the reverse revolution of a reversible motor and the conveyor belt moves the sheet on the sheet glass in the reverse direction. As soon as the top end of the sheet comes in contact with a stepped stopper plate installed at the edge of the sheet glass, the conveyance of the sheet is stopped.

After such stop of sheet conveyance, the side B of the sheet is scanned and exposed to light, resulting in the formation of copied images on recording paper.

After that, the conveyor belt is switched to forward running, and the sheet is conveyed forward on the sheet glass and fed through the paper ejection path of the paper ejection inversion unit via an ejection opening onto the external tray.

In the above proposed RADF, however, the inversion of a sheet for the exposure of the back to light, whose obverse has been exposed to light, is accomplished by means of more than one paper path, resulting in the complicated conveyance. In addition, the conveyor roller must be switched frequently for changing the rotation direction, and many paper supply and ejection selection members must be installed at the paper paths. Thus, such RADF cannot help being large, complicated, and expensive.

In particular, the overall sheet inversion and conveyance path of the inverting section must be much longer than maximum length of a sheet to be fed. So, the inversion section occupies a great volume.

In the conventional sheet conveyance apparatus, a conveyance section is installed above sheet mount glass and, on the elongation of its end, an inverting section is installed in series, resulting in a very large sheet conveyance apparatus and a great installation area.

When opening the sheet mount glass surface in a copier equipped with the conventional large sheet conveyance apparatus having conveyance and inverting sections arranged in series many manual operations may be required. Further, the respective operability in jammed sheet removal and in pressing work for book-like sheets and special sheets is low.

Additionally, to drive and revolve the paper ejection roller and inverting roller of the sheet ejection and inversion unit, the conventional sheet conveyance apparatus transmits power from the drive source directly by using a timing belt or a gear string. Thus, a drive source must be installed independently from a drive source for a conveyor belt; in the result, a great, complicated power transmission system is needed.

In the paper ejection and inversion unit equipped with a paper ejector having a pair of upper and lower rollers coming in pressing contact with each other, a sheet must always be conveyed as being kept in a plane, when the sheet is led to an inversion and circulation passage and is conveyed on the pressed condition by a reversing roller. A sheet to be ejected from the paper ejection roller tends to be jammed.

After a sheet to be ejected from the paper ejection roller onto the paper ejection tray has passed the nipping location of the paper ejection roller, the sheet comes in contact with the tray surface or sheets delivered previously on the tray, is attracted to them, and then is not ejected to a correct position. Thus, the trailing edge of the sheet stays at the passage near the paper ejection roller and causes a following sheet to be jammed.

Hitherto, there has been proposed a method of providing ribs on the paper ejection roller to cause a fed sheet to form a curved wave-like surface. In the RADF which is equipped with a common passage used for a paper ejection path and an inversion and circulation path at the downstream side of the nipping location of the paper ejection rollers having the ribs thereon, paper may be ejected successfully, but when a sheet is inverted and circulated, the curved wave-like surface tends to be rumpled by the inversion nipping roller, damaging the sheet.

A sheet conveyed directly by the conveyor belt in the RADF is moved with a relative friction onto a sheet glass surface, thereby being electrostatically charged. The sheet introduced into the paper ejection and inversion unit of the RADF comes in contact with guide plates forming the conveyance path and further produces electrostatic charges frictionally. The higher the sheet conveyance speed, the more frictional electrostatic charges a sheet produces. In particular, during automatic sheet inversion and conveyance in which sheets are repeatedly fed in normal and reverse conveyance direction, the amount of produced frictional electrostatic charges tends to be large.

When a sheet fed from the sheet inversion section of the above paper ejection and inversion unit onto the sheet glass surface is further conveyed by being inserted between the conveyor belt and the sheet glass, if the sheet is electrostatically charged, the charged sheet is repulsed from or adsorbed by the sheet glass or the conveyor belt, resulting in positional deviation and deformation, and thus further causing improper conveyance. So, a sheet is not set properly or broken at its edge. The result is that a sheet is not copied suitably, is damaged, or jammed.

SUMMARY OF THE INVENTION

An object of the present invention is to provide sheet conveyance apparatus of a simple configuration that can securely form and close a gap between a conveyor belt and a stepped stopper plate and never depends on relative conditions of a drive roller and the stepped stopper plate.

A particular object of the present invention is to allow a sheet to come correctly in contact with the stepped stopper plate without passing through it, during reverse sheet conveyance by the reverse rotation of the conveyor belt, and to prevent the conveyor belt from running unsuitably and being broken.

To achieve the above objects, the present invention provides sheet conveyance apparatus that is so configured that an original document sheet is forwarded onto sheet glass by a conveyor belt capable of running forwardly and backwardly on the sheet glass, and then is conveyed backwardly so as to cause its end to come in contact with a stepped portion of a stopper plate installed at the edge of the sheet glass, characterized in that near the stepped stopper plate are provided a belt press roller that can be movable in response to the forward and backward movement of the conveyor belt and a restricting means that has an engaging element engaging the belt press roller so as to keep the roller at the predetermined position. During the reverse running of the conveyor belt, the belt keep roller is released from the engaging element by activating the restricting means when a sheet is fed near the stepped stopper plate, and thus the roller moves and presses the sheet onto the stepped stopper plate via the conveyor belt.

An object of the present invention is to provide small, light-weight, good-operability sheet conveyance apparatus (RADF) that does not need a large installation area and is equipped with a sheet inversion mechanism.

The above object is achieved by sheet conveyance apparatus that is provided with a paper supply section, a conveyance section, an inverting section and a paper ejecting section on the sheet mount glass. The apparatus feeds a sheet from the paper supply section onto the sheet mount glass, conveys the sheet by means of a conveyor belt of the conveyance section, exposes the surface A of the sheet to light and inverts the sheet for exposure of the surface B to light by the inverting section comprising an inverting route, and then ejects the sheet to a paper ejection section having a sheet ejection tray. The apparatus according to the invention is characterized in that the inverting section is installed above the conveyance section.

Further, the above object is achieved by sheet conveyance apparatus of the present invention characterized by installing an inverting section and a paper ejection section above the conveyance section.

In sheet conveyance apparatus comprising a sheet supply section, a sheet conveyance section and a sheet ejection and inversion section, near the sheet ejection opening of the sheet ejection and inversion section are provided at least a pair of paper ejection rollers that are revolved in contact with each other, and adjacent to the downstream ejection side relative to the nipping position of the sheet ejection roller is provided a regulating plate for shaping an ejected sheet in a wave form.

In sheet conveyance apparatus that is equipped with a sheet supply unit at one end and a sheet ejection and inversion unit at the other end, wherein the apparatus feeds sheets from the sheet supply unit onto a transparent sheet plate one by one, conveys a sheet into the sheet ejection and inversion unit comprising circulating paths and inverts the sheet surface, feeds again the sheet onto the transparent sheet plate, and ejects the sheet exposed to light to the outside, the conveyor belt is made to be endless, a one-direction operable clutch is installed in a roller which is revolved in contact with the inner surface of the conveyor belt, and another one-direction operable clutch is further installed in the other roller which is revolved in contact with the outer surface of the conveyor belt so that the normal and reverse rotation of the conveyor belt may be transmitted as one directional revolution drive force via the rollers with the one-direction operable clutch to the drive roller of the sheet ejection and inversion unit.

Further, a pair of sheet ejection rollers that are revolved in contact with each other is installed near the ejection opening of the sheet ejection and inversion unit, a movable sheet conveyance switching means that separates a sheet path into the sheet ejection path or the sheet inversion and circulation path is installed near the sheet delivering section of the sheet ejection roller, and a plurality of regulating plates is constructed integrally with the sheet ejection side wall of the switching means at both sides of the sheet ejection roller on the downstream side with respect to sheet ejection direction from the roller nipping position so that the ejected sheet surface may be shaped in a wave form.

In addition, a de-energizing brush is installed in the path from the sheet inversion section of the sheet ejection and inversion unit to the transparent sheet plate.

BRIEF DESCRIPTION OF THE DRAWINGS

FIGS. 25-1, 25-2, 25-3 provide a flow chart for describing the sheet conveyance process.

DETAILED DESCRIPTION OF THE INVENTION

Figure 1:
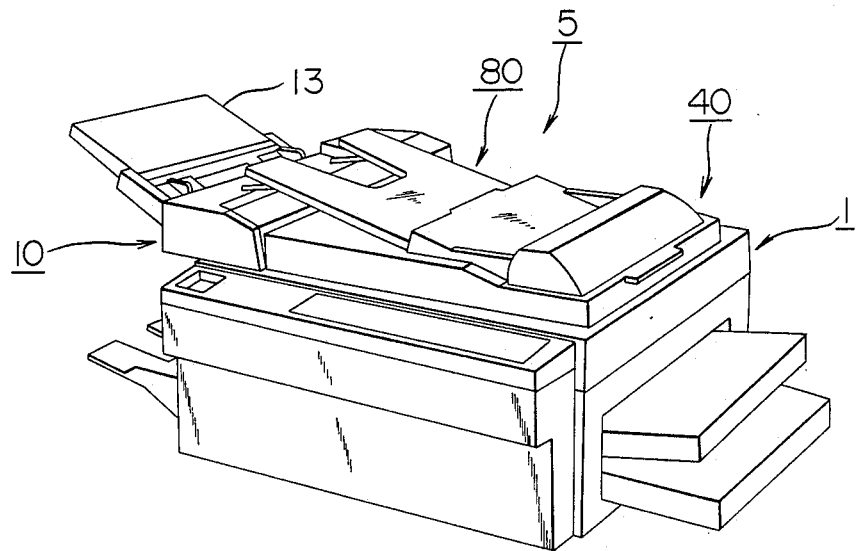
FIG. 1 provides an oblique outside view of a copier equipped with a sheet conveyance apparatus of the present invention.

Given below is a description of the present invention based on preferred embodiments shown in attached figures. FIG. 1 provides an oblique outside view of a copier equipped with sheet conveyance apparatus. In the Figure, numeral 1 denotes the copier main body and 5 denotes the sheet conveyance apparatus. Sheet conveyance apparatus 5 is installed on sheet glass 2 on copier main body 1.

Figure 2:
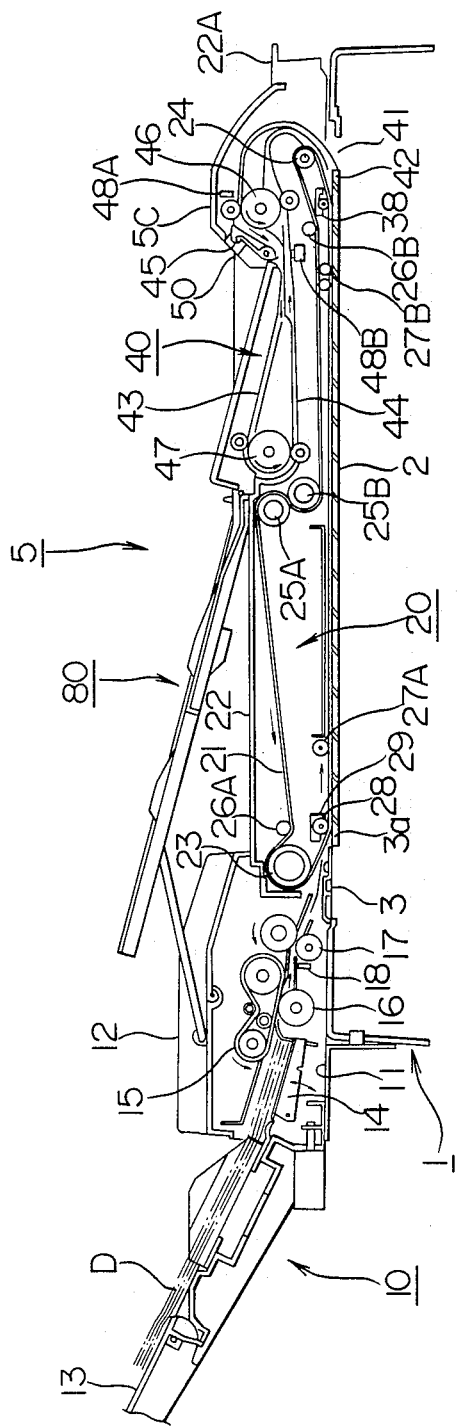
FIG. 2 provides a cross sectional view of the sheet conveyance apparatus showing the sheet conveyance path.
Figure 3:
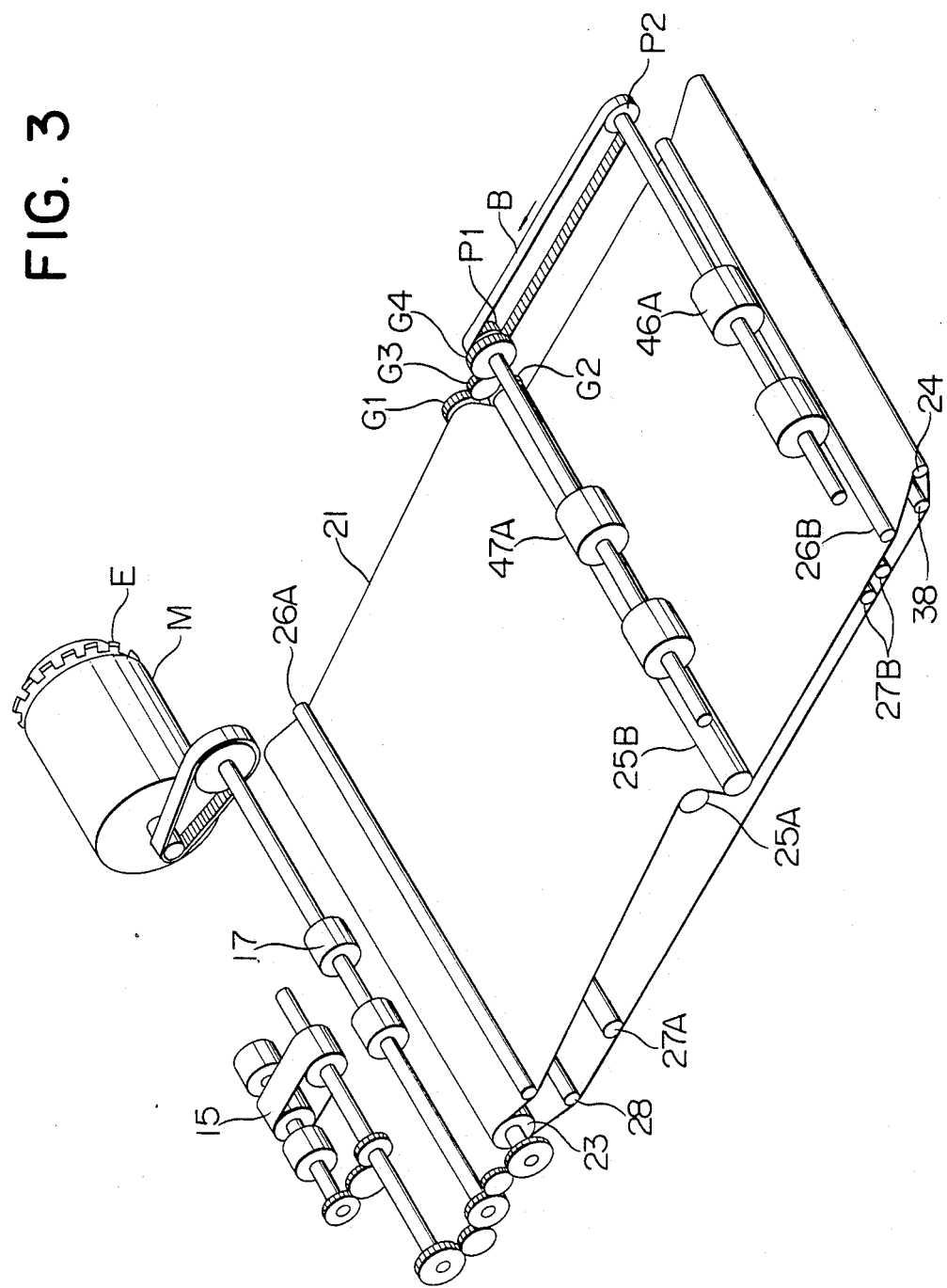
FIG. 3 provides an oblique view showing the drive system of the sheet conveyance apparatus.

FIG. 2 provides a cross sectional view of sheet conveyance apparatus 5 indicating a sheet conveyance route. FIG. 3 provides an oblique view indicating the drive system of said sheet conveyance apparatus 5.

Sheet conveyance apparatus 5 comprises a conveyance unit 20 provided with a conveyor belt 21 that can be rotated in both directions on the upper surface of sheet glass 2, a sheet supply unit 10 located at one end of sheet glass 2, a sheet ejection and inversion unit 40 located above the other end of sheet glass 2, and an ejection tray section 80 located above conveyance unit 20. A frame 11 supporting sheet supply unit 10 is screwed on copier main body 1 and covered by an external enclosure 12. Conveyance unit 20 and sheet ejection and inversion unit 40 are accommodated in a housing 22, which is supported by frame 11 and a hinge or equivalent and can be opened to CCW (counterclockwise) directions with a knob 22A shown on the right side. In the Figure, conveyance unit 20 and sheet ejection and inversion unit 40 are laid down to the right so that sheet conveyance belt 21 presses sheet glass 2 arranged on the top of copier main body 1.

Sheet conveyance apparatus 5 of the present invention has the capability to automatically feed a sheet by means of a conveyance mechanism described later. Manually opening and closing overall sheet conveyance apparatus 5 provides the function as the typical platen cover.

Sheet supply unit 10 comprises a first sheet supply section for separating sheets D on a sheet tray 13 from their uppermost position one by one and feeding them, and a second sheet supply section for supplying the sheet fed from said first sheet supply section to conveyor belt 21.

First, mount a pad of sheets to be copied on sheet tray 13 with the surface A (obverse) of the first page facing downward.

Next, press the copy button, and a motor drive relay in the sheet conveyance apparatus is turned on, a motor M starts turning in a normal direction. This motor revolution is followed by the start of the normal running (CCW (counterclockwise) running) of an arranging belt 15, a sheet supply roller 17, and conveyor belt 21. At the same time, a sheet supply solenoid is activated and a movable guide plate 14 of the first sheet supply section is lifted up to press sheets D stacked thereon against arranging belt 15. Arranging belt 15 starts to rotate toward the arrow direction, whereby sheets D are squeezed by rotating arranging belt 15 and arranging roller 16, then only the top one of the stacked sheets is selectively sent out. When the edge of the sheet gets near sheet supply roller 17 of the second sheet supply section rotating toward the arrow direction, said sheet supply solenoid is turned off by a detection signal of a sensor 18, and movable guide plate 14 is lowered, stopping subsequent sheet supply and conveying only the above sheet by means of sheet supply roller 17.

Sheet D conveyed by sheet supply roller 17 passes over a stopper plate (scale plate) 3 for positioning the rear edge of sheet D and reaches the press contact position between sheet glass 2 secured above copier main body 1 and conveyor belt 21 of conveyance unit 20, conveyance of sheet D is further continued by the frictional force of turning conveyor belt 21.

When the rear edge of sheet D passes sensor 18, the size of sheet D is detected automatically, and it is judged whether or not sheet D is jammed in the conveyance path.

Conveyor belt 21 is extended over a drive roller 23, a following roller 24, and intermediate rollers 25A and 25B supported rotatably by bearing on a bearing plate fixed at both side walls of housing 22, and can be rotated positively and reversely by a reversible motor M. The upper running surface of conveyor belt 21 is stretched by tension rollers 26A and 26B supported adjustably on said bearing plate, while the lower running surface is held by means of pressing rollers 27A and 27B secured on a bearing element fitted on said bearing plate, a belt keep roller 28, and a separating roller 38.

Figure 4:
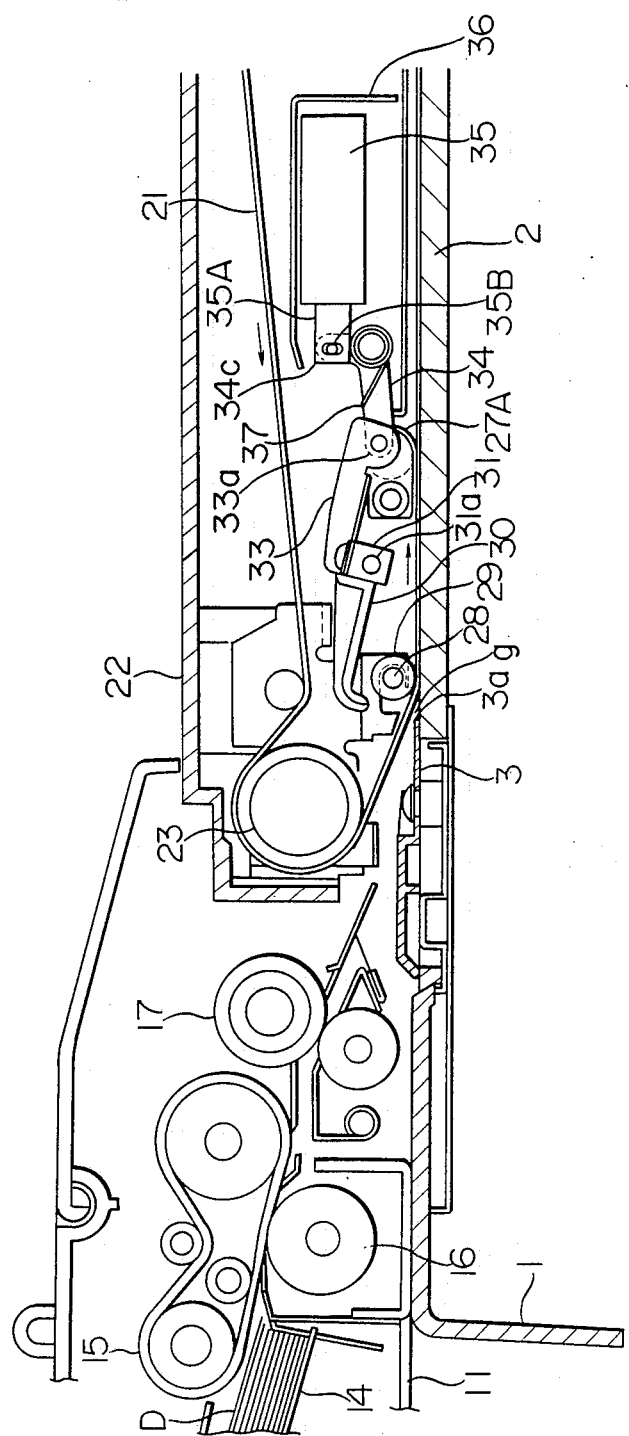
FIGS. 4, 5, 6, and 7 provide a cross sectional view, a plan view, an oblique view, and an explosion view, respectively, showing the important part near the drive roller in the sheet conveyance apparatus.
Figure 5:
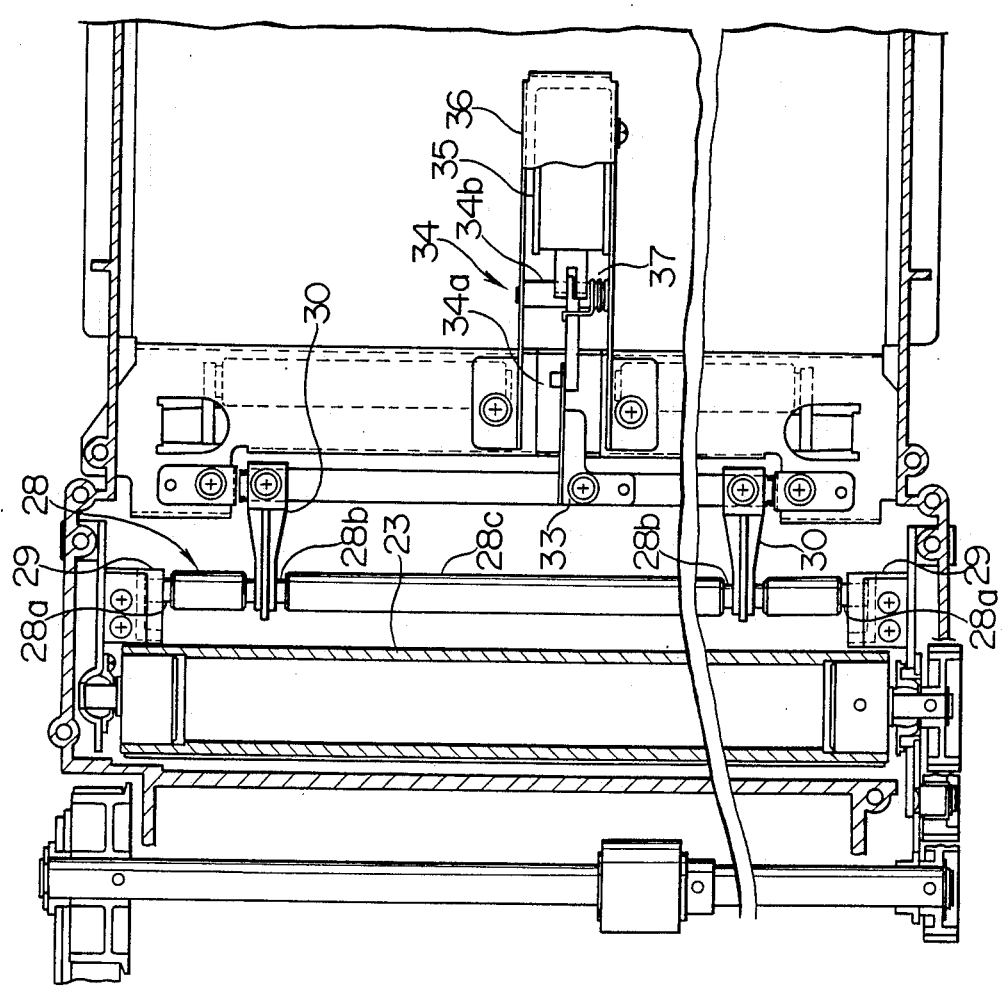
Figure 6:
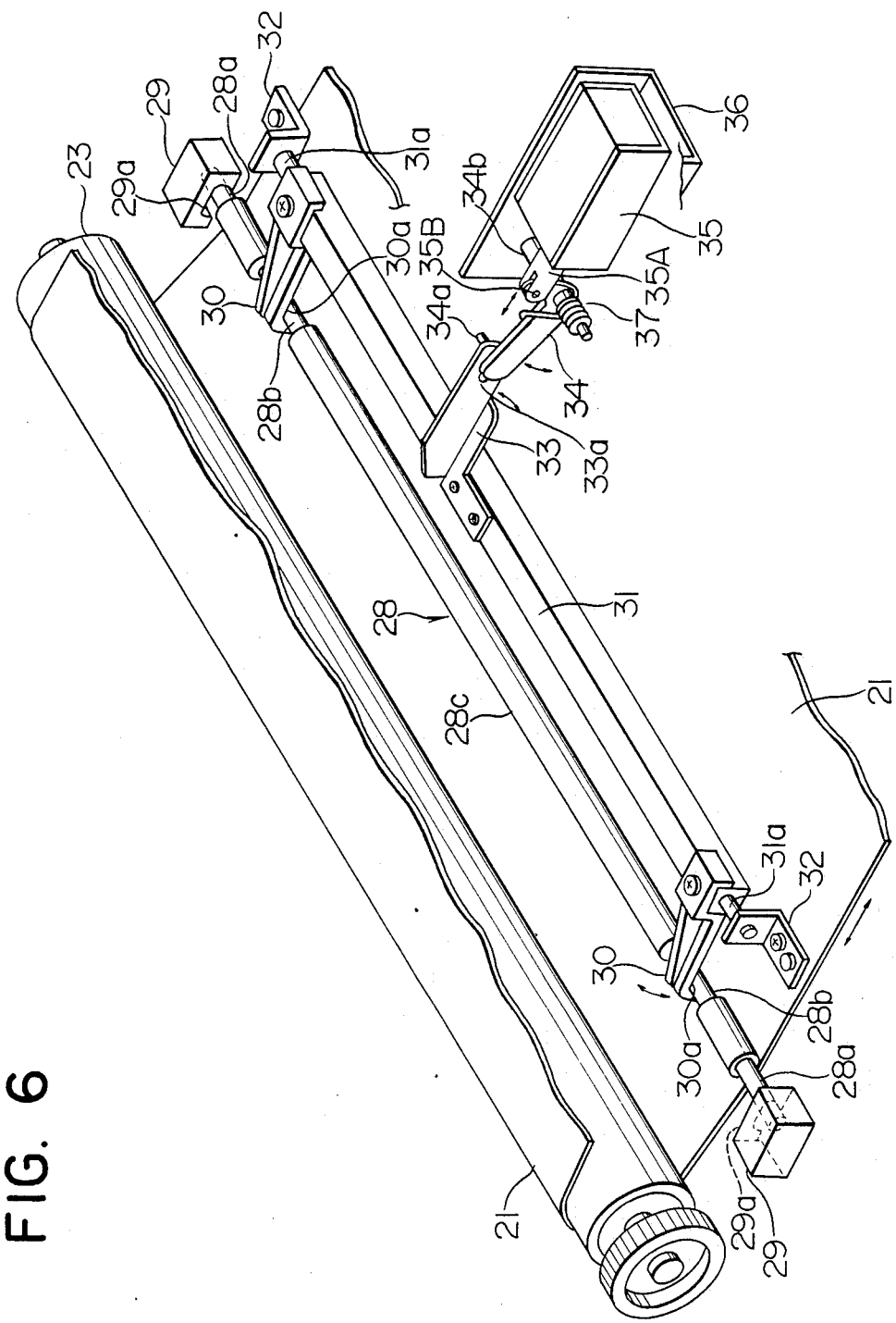

FIGS. 4, 5 and 6 provide a cross sectional view, plan and oblique view of the important section near drive roller 23 of sheet conveyance apparatus, respectively.

Bearing element 29 supporting belt keep roller (swing back roller) 28 located near drive roller 23 out of the above rollers is so arranged that roller 28 may be moved almost horizontally interlockingly with the running of conveyor belt 21 between the position almost above a step section 3a of stopper plate (scale plate) 3 secured on the sheet supply side edge of sheet glass 2 and the position (see FIG. 4) right from the above position, or the position along the sheet supply direction.

Figure 7:
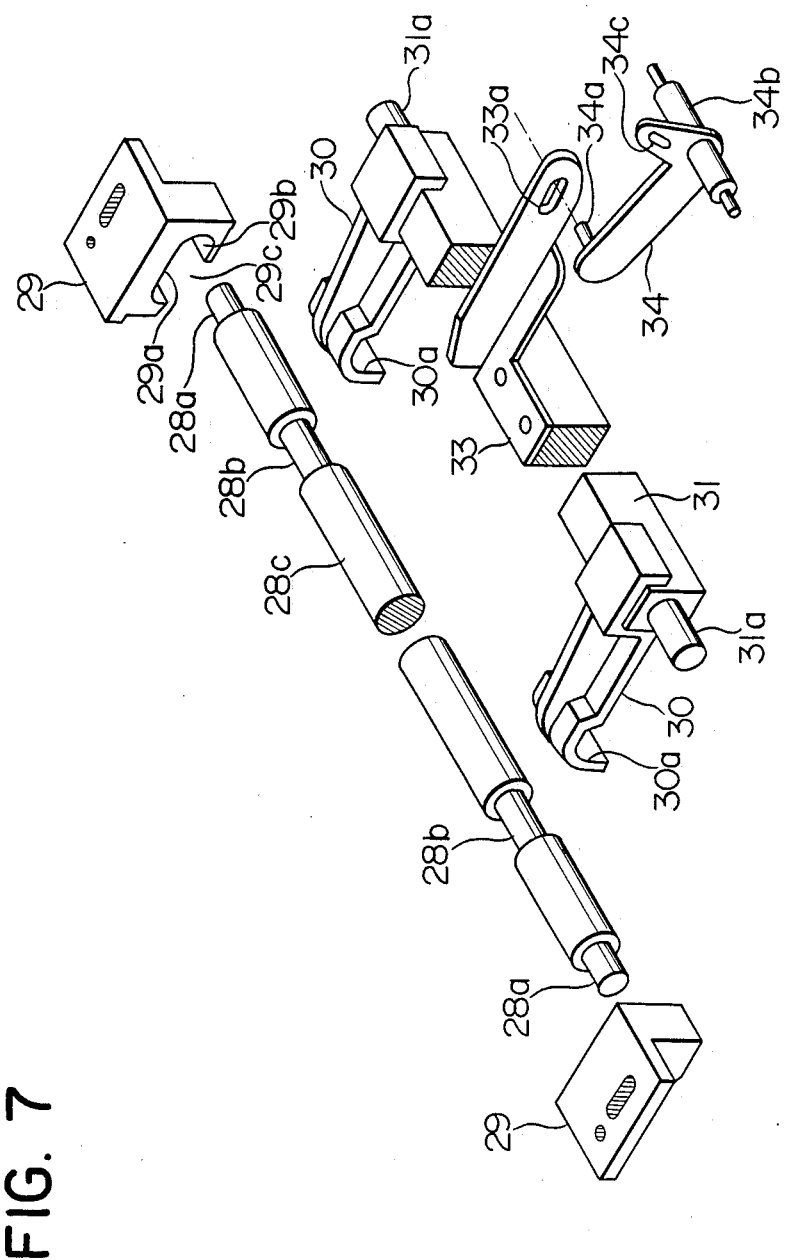
Figure 8:
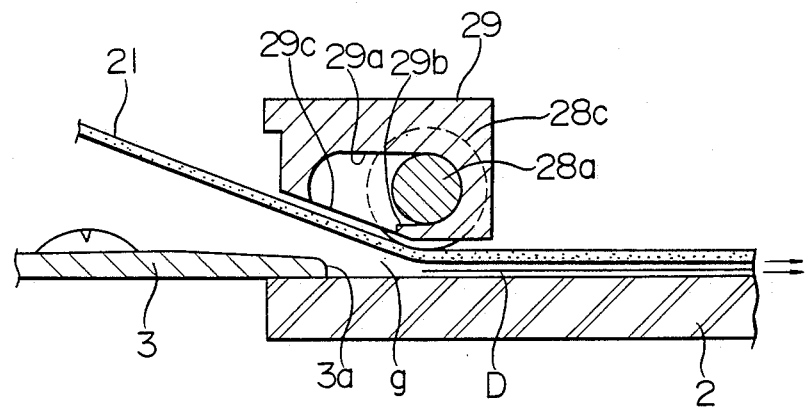
FIGS. 8 (A) and (B) provide extended cross sectional views showing details of the shaft end section of the belt keep roller.
Figure 8:
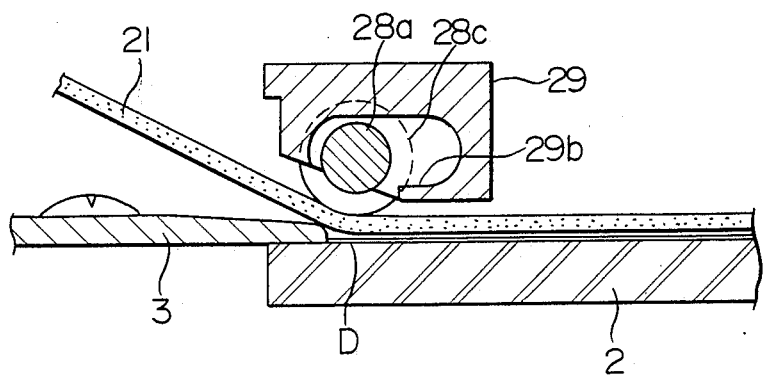
Figure 9:
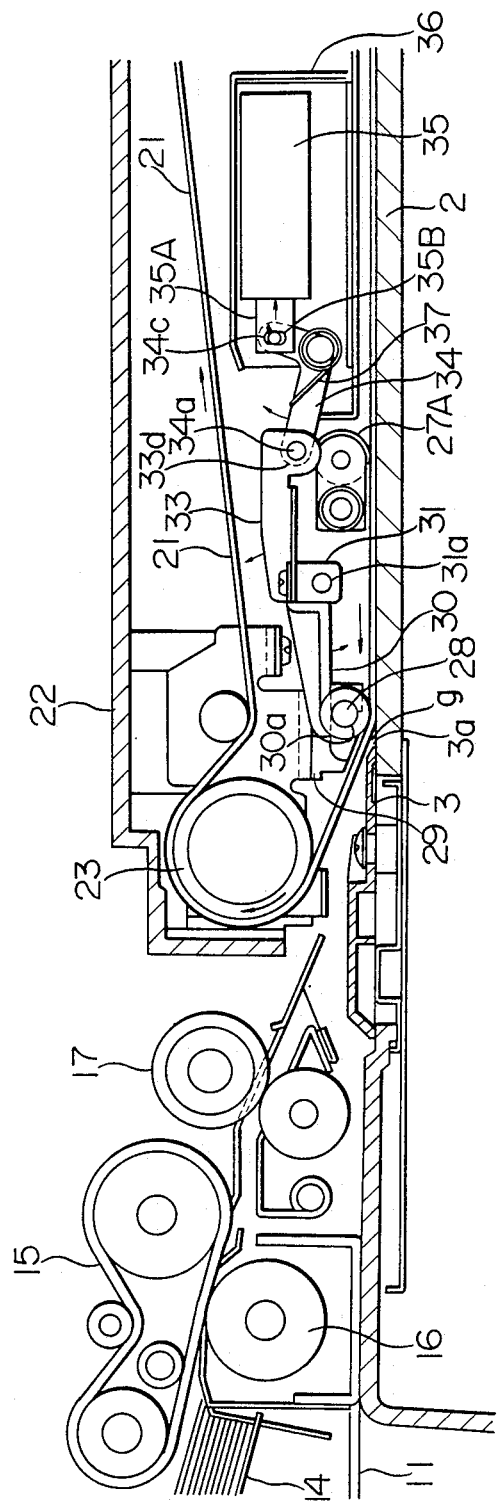
FIGS. 9 (A) and (B) provide partial cross sectional view describing the restricted and freed belt keep roller.
Figure 9:
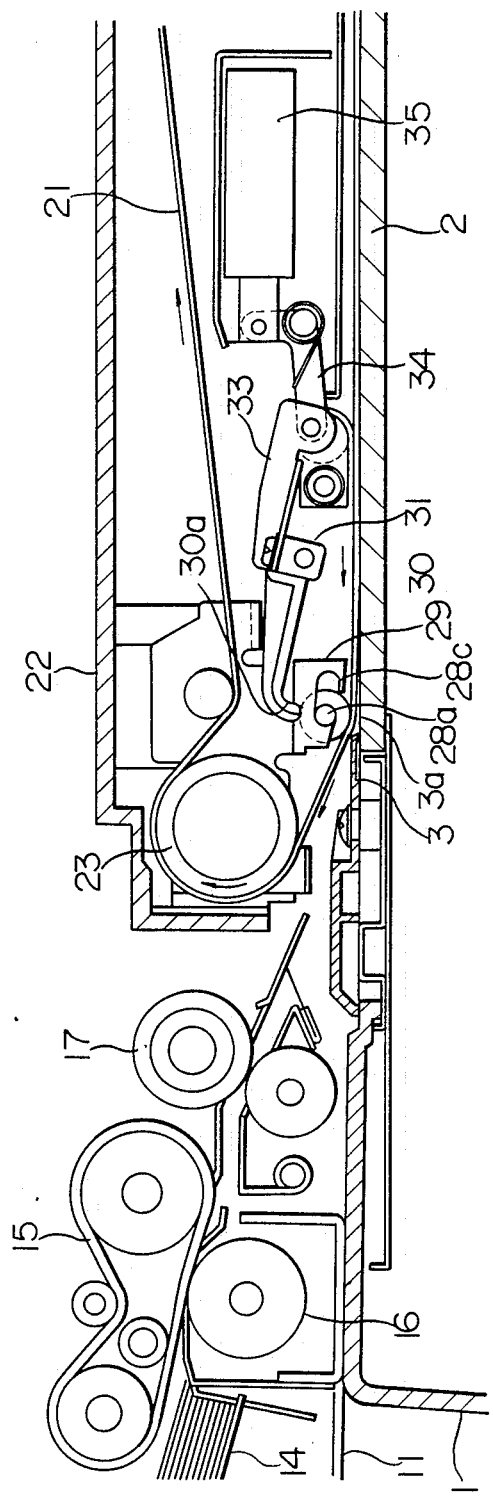

FIG. 7 provides an enlarged view showing the shapes of belt keep roller 28, bearing element 29, and a restriction element. FIGS. 8 and 9 provide expanded cross sectional views showing details of a shaft edge section 28a of belt keep roller 28, respectively.

As shown in FIGS. 6 and 7, bearing element 29 is provided with an elliptically-shaped groove section 29a, with shaft edge section 28 of belt keep roller 28 mated into groove section 29a so that belt keep roller 28 may be moved longitudinally along the longer axis of groove section 29a.

At the lower end of groove section 29a, shaft support section 29b is projected which supports shaft edge section 28a of belt keep roller 28 rotatably to prevent dropping. On the other hand, the other lower end of groove section 29a is cut out, forming an open in 29c. Shaft edge section 28a of belt keep roller 28 mated into groove section 29a can be lowered from opening 29c, when it is moved near said opening.

At two intermediate positions of belt keep roller 28 near shaft edge section 28a, a stepped section 28b having a small diameter is formed, to/from which engaging portion 30a of a rocking arm 30 can be mated/removed.

The other ends of two rocking arms 30 are screwed near both edges of a square column like rocking shaft 31. Both axis ends 31a of rocking shaft 31 are mated into the hole of a hinge element 32, being supported rotatably.

Near the center of rocking shaft 31, a link plate 33 is secured, as shown in FIG. 6. At the other end of link plate 33, a long hole 33a is provided, with a shaft 34a of one end of an L-shaped rocking lever 34 mated into long hole 33a so that it may be slid.

A rotation center shaft 34b of rocking lever 34 is integral with levers projected to both sides, and mated rotatably into through holes on both side plates of a box-shaped holding plate 36 holding an electromagnetic solenoid 35 fixedly. Rotation center shaft 34b is surrounded with torsion spring 37, one end of which is hooked on rocking lever 34 and the other end is hooked on holding plate 36 so that rocking lever 34 is biased to a predetermined direction.

The upper end of rocking lever 34 is provided with an elliptic hole 34c, into which a fixing pin 35B installed at the tip of a plunger 35A of electromagnetic solenoid 35 is mated so that it may be slid.

Given below is a description of the operation of belt keep roller 28 based on partial cross sectional views of FIGS. 8, (A) and (B), and 9, (A) and (B).

Sheet D fed from sheet supply unit 10 passes through an inlet section formed by the gap between conveyor belt 21 of conveyance unit 20 and stopper plate 3 and reaches the press contact position between sheet glass 2 and conveyor belt 21, conveyance of sheet D is further continued by the frictional force caused by the movement of conveyor belt 21.

In the sheet feeding and conveyance process, when conveyor belt 21 is rotated in CCW (normal) direction, belt keep roller 28 is not held so as to be caught by rocking arm 30 and can be moved as shown in FIG. 4; it is moved to the right away from step 3a of stopper plate 3 as conveyor belt 21 runs. Shaft edge 28a of belt keep roller 28, as being turned to CCW direction, is moved to the right along groove section 29a of bearing element 29, and comes in contact with the right edge surface of groove section 29a, thus the movement to the right is stopped but shaft edge 28a is kept to be turned following conveyor belt 21.

FIGS. 4 and 8(B) show this state, with shaft edge 28a of belt keep roller 28 mated into and supported by shaft support section 29b of bearing element 29 and turned in contact with and following conveyor belt 21 without being lowered from opening 29c.

Figure 10:
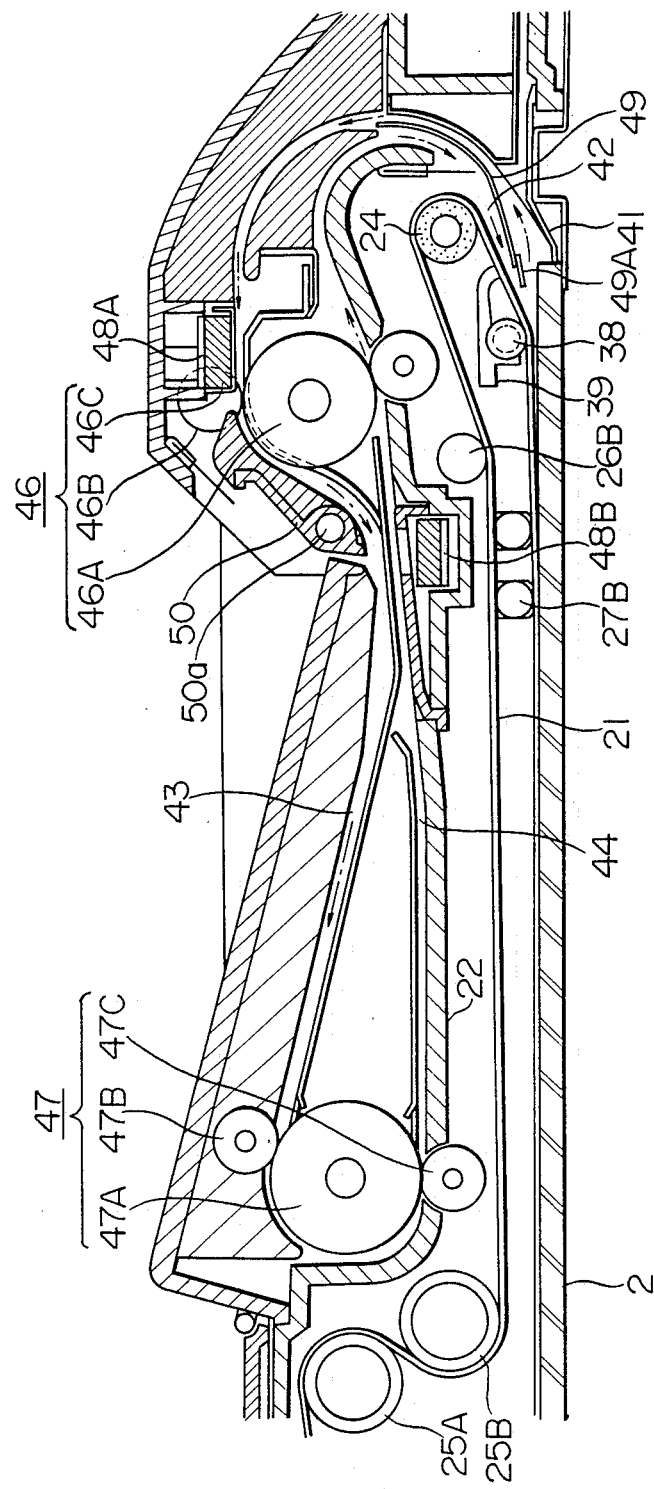
FIGS. 10 (A) and (B) provide cross sectional views of the sheet ejection and inversion unit.
Figure 10:
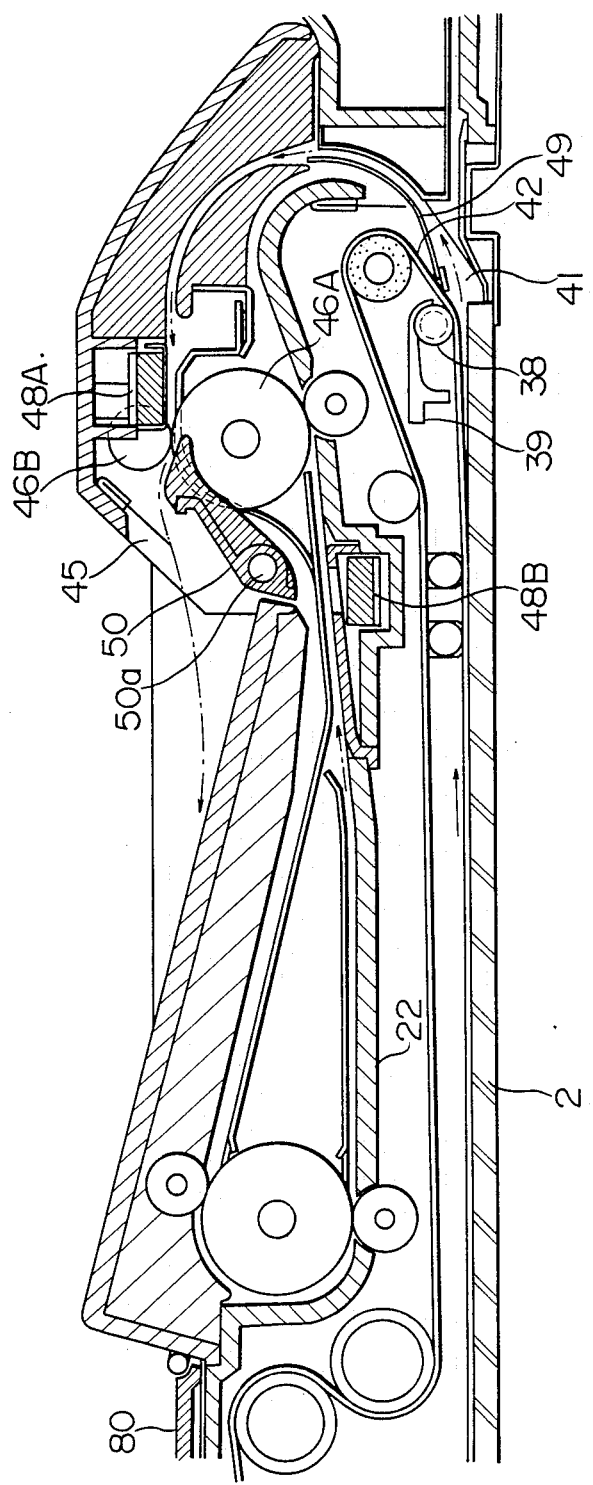

FIG. 10(A), which provides a cross sectional view showing the important part near sheet ejection and inversion unit 40 of sheet conveyance apparatus 5 as shown in FIG. 2, indicates how a sheet is inverted and conveyed.

Sheet ejection and inversion unit 40 is provided with an ejection route of sheet D and a sheet inversion route for inverting sheet D to copy both surfaces thereof. Sheet ejection and inversion unit 40 comprises a feeding out path 41, an inversion feeding path 42 and inverting paths 43 and 44 including guide plates, a pair of sheet ejection rollers 46, a pair of inverting rollers 47, a sheet conveyance switching element 50, and sheet tip sensor (sheet ejection sensor) 48A and a rear end sensor (sheet inversion sensor) 48B.

Pair of sheet ejection rollers 46 comprises a central roller 46A, and an upper roller 46B and a lower roller 46C that can be turned following said central roller 46A. Pair of inverting rollers 47 comprises a central roller 47A, and an upper roller 47B and a lower roller 47C that can be turned following said central roller 47A.

Figure 11:
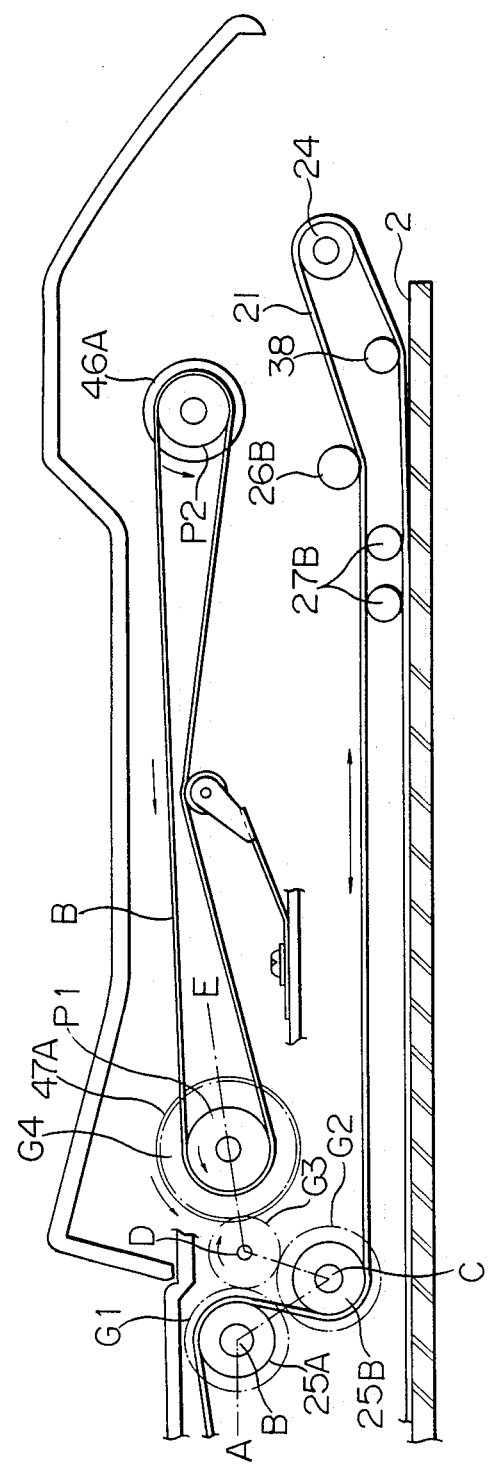
FIG. 11 provides a side cross sectional view showing the drive system of the sheet ejection and inversion unit.
Figure 12:
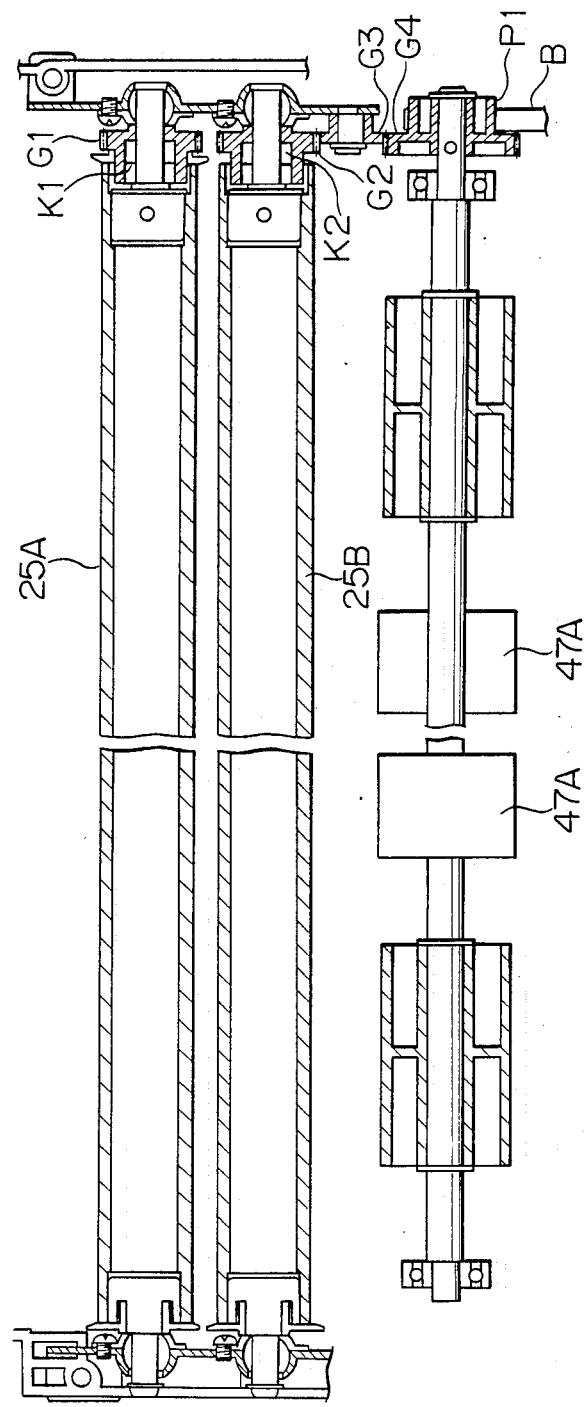
FIG. 12 provides a developed cross sectional view of the drive system along A-B-C-D-E.

FIGS. 3 and 11 provide an oblique view and a cross sectional view indicating the power transmission of sheet ejection central roller 46A and inversion central roller 47A. FIG. 12 provides a cross sectional view developed along dashed lines A-B-C-D-E in FIG. 11.

In these Figures, the shaft ends of intermediate rollers 25A and 25B rotated following conveyor belt 21 are provided with gears G1 and G2 incorporating unidirectional clutches K1 and K2, respectively. Gears G1 and G2 are always engaged with an idle gear G3, which is further engaged with a gear G4 secured at the shaft end of inversion central roller 47A. Between a toothed pulley P1 being integrated with gear G4 and a toothed pulley P2 secured at the shaft end of sheet ejection central roller, a toothed belt B is arranged, which transmits the rotation force of inversion central roller 47A to sheet ejection central roller 46A.

When drive roller 23 is rotated normally (CCW) by the normal revolution of motor M and drive force rotates and runs conveyor belt 21 forward (CCW) direction, lower intermediate roller 25B is idled by incorporated clutch K2, transmitting no power to idle gear G3. Only intermediate roller 25A is turned to CCW direction by clutch K1, turning inversion intermediate roller 47A to CCW by gear G1 via idle gear G3 and gear G4. Toothed pulley P1 secured coaxially with gear G4 is turned and toothed pulley P2 is turned by toothed belt B, turning coaxial sheet ejection central roller 46A to CCW. Thus, by the forward running of conveyor belt 21, both central rollers 46A and 47A in sheet ejection and inversion unit 40 are turned to CCW to eject or invert received sheet D.

When motor M is switched to reverse revolution, its drive force runs conveyor belt 21 reversely (clockwise: CW) via drive roller 23. At this time, intermediate roller 25A is idled by the non-operation of uni-directional clutch K1, and only other intermediate roller 25B, being integrated with gear G2 by built-in clutch K2, can transmit turn power, turning inversion central roller 47A to CCW by gear G2 via a gear train of idle gear G3 and gear G4, and further turning sheet ejection central roller 46A to CCW via toothed pulleys P1 and P2 and toothed belt B.

Thus, during both normal and reverse running of conveyor belt 21, both inversion central roller 47A and sheet ejection central roller 46A are turned to CCW to convey sheet in sheet inversion unit 40 to the predetermined direction.

FIG. 10(B) provides a cross sectional view of sheet ejection and inversion unit 40 indicating how sheet D is ejected to ejection tray 80.

Figure 13:
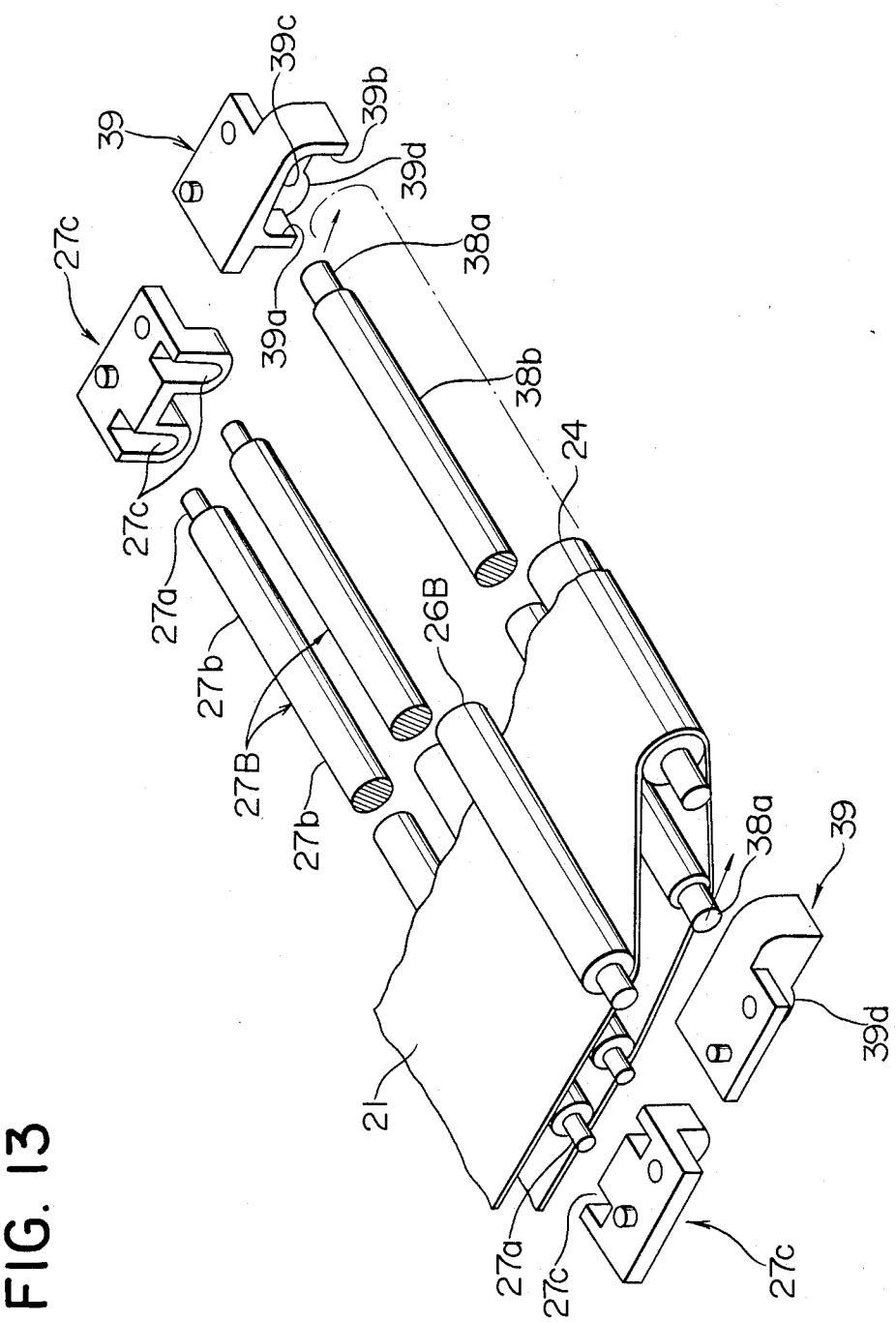
FIG. 13 provides an oblique explosion view showing the important part near follower and pressing rollers.

FIG. 13 provides an oblique explosion view indicating the major part near the follower roller.

In the Figure, pressing roller bearing 27c supporting both shaft ends 27a of pressing roller 27B, and a separating roller bearing 38 supporting both shaft ends 38a of a separating roller 38 are removed externally.

Pressing roller 27B is arranged inside conveyor belt 21 near follower roller 24 at one side of sheet glass 2.

Both shaft ends 27a of pressing roller 27B are forced into guide groove 27c of pressing roller bearing 27c, making pressing roller 27B vertically movable and rotatable.

The upper surface of pressing roller bearing 27c comes in contact with the fixed portion of conveyance unit 20, and is screwed after been positioned. Pressing roller bearing 27c is arranged so that the length of the sheet conveyance route from pressing roller 27B to the pressing position between sheet ejection rollers 46A and 46B becomes shorter than the minimum sheet length.

A roller surface 27b of pressing roller 27B pressures sheet glass 2 via conveyor belt 21. During the normal running of conveyor belt 21, sheet D on sheet glass 2 is pressured by pressing roller 27B via conveyor belt 21, being conveyed along with conveyor belt 21. Pressing roller 27c is arranged in narrow space inside conveyor belt 21. If pressing force by the weight of pressing roller 27B is insufficient, a plurality of pressing rollers 27B may be installed in parallel, as shown in the Figure.

The upper surface of separating roller bearing 39 comes in contact with the fixed portion of conveyance unit 20, and is screwed after having been positioned.

The inner wall below the separation roller bearing 39 is projected and comprises a left contact surface 39a, a right contact surface 39b, and a guide slope surface 39c. Both shaft ends 38a of separation roller 38 come in contact with these surfaces or is moved thereto. An arc like projection 39d located at the bottom of bearing 39 is a lower contact surface coming in contact with the upper surface of sheet glass 2.

With both shaft ends 38a of separation roller 38 mated into the projected inner wall of separation roller 39 and positioned there, roller surface 38b of separation roller 38 is forced against the inner wall of conveyor belt 21, curving and tensioning conveyor belt 21.

The positive (CCW) revolution of drive roller 23 causes conveyor belt 21 arranged between roller 23 and follower roller 24 to be run. Thus, intermediate roller 25A, pressing rollers 27A and 27B, belt keep roller 28, and separation roller 38 arranged inside conveyor belt 21 are revolved unidirectionally following conveyor belt 21.

Roller surface 38b of separation roller 38 comes in contact with and is turned following conveyor belt 21, with both its shaft ends 38a rotated to the right from contact surface 39a of separation roller bearing 39 and moved obliquely upward along guide slope 39c.

By movement of separating roller 38 to the right, conveyor belt 21 is projected to the right outside.

FIGS. 2, 10(A), 11, and 13 show the state the start of shaft movement, and FIG. 10(B) shows the state after completion of the shaft movement.

Under the state of FIG. 10(B), the tip of a separating guide plate 49 separating sheet feeding path 41 and inversion and insertion path 42 from each other comes to near conveyor belt 21 projected to the right, keeping the opening of inversion and insertion path 42 being minimum (e.g. about 0.5 mm). If elastic plate 49A, e.g. film-like polyethylene terephthalate, is attached at the tip of separating guide plate 49 so that plate 49A is projected slightly from the tip, even when conveyor belt is loosened or disarranged, conveyor belt 21 may never come directly in contact with rigid separating guide plate 49 and is not worn nor damaged, because it only comes in contact with the tip of elastic plate 49A.

By the reverse rotation of drive roller 23, conveyor belt 21 and follower roller 24 start to be run reversely. Thus, separating roller 38 turned by the press contact with conveyor belt 21 is turned reversely. Its both shaft ends 38a begin to move from a right contact surface 39b of separating roller bearing 39 to the left, move as rotating along a slanted guide surface 39a, come in contact with left contact surface 39a and stop shaft movement, and only rotate at that position. FIG. 10(A) shows the state where reverse movement is stopped.

Figure 14:
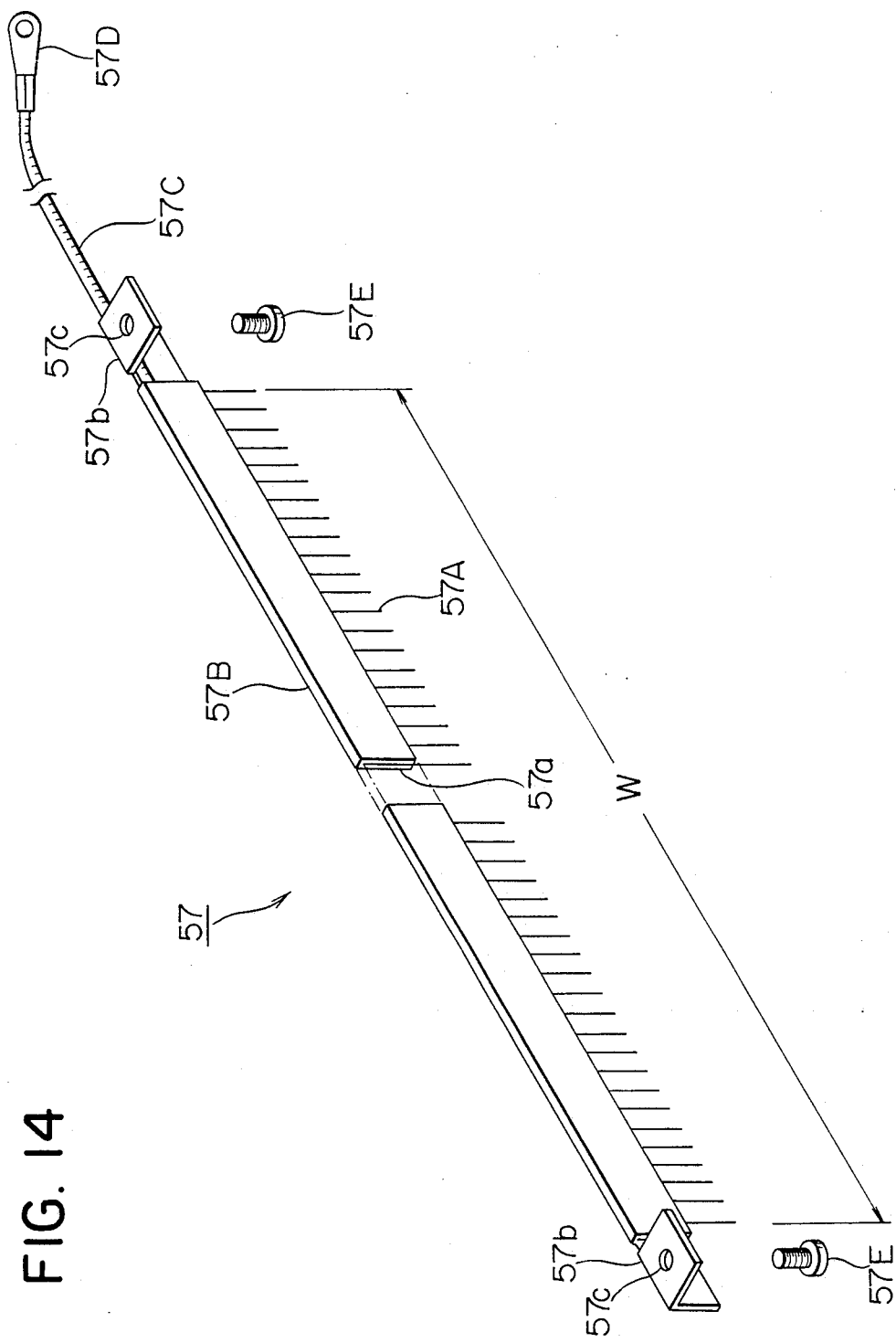
FIG. 14 provides an outside view of the de-energizing brush, an important element of the present invention.

FIG. 14 provides an oblique view of de-energizing brush 57 installed at part of inversion and insertion path 42.

De-energizing brush 57 comprises brush hair 57A including a plurality of conductive fiber elements, a conductive brush holder 57B holding brush hair 57A, a ground cord 57c connected to brush holder 57B, and a solderless terminal 57D connecting ground cord 57C to a ground section in apparatus.

Brush hair 57A comprises conductive fiber elements arranged in a line at the same interval. Their one ends base portion are inserted into and fixed at a bent section 57a of brush holder 57B, and the other ends are projected from bent section 57a, freely and deflectively, and their tips are cut so as to be the same length. The effective brush width W of brush hair 57A is almost equal to the maximum width of sheet D.

Brush holder 57B, which is of molded conductive plate material such as aluminum alloy plate, comprises central bent section 57a and fittings sections 57b located at both ends. Fitting sections 57b of both ends are provided with an attachment hole 57c. De-energizing brush 57 causes fitting sections 57b to come in contact with position of housing 22; fitting sections 57b are screwed at attachment hole 57c by means of a screw 57E. De-energizing brush 57 is installed at sheet inversion and insertion path 42 formed between conveyor belt 21 running around follower roller 24 and separating guide plate 49, and the top of brush hair 57A come to near the surface of separating guide plate 49.

Below one fitting section 57b of brush holder 57B, ground cord 57C is installed, whose conductive part is connected to brush holder 57B. At the other end of ground cord 57C, solderless terminal 57D is crimped and fixed, which is screwed to the ground member of the apparatus, so that brush hair 57A, brush holder 57B, the conductors of ground cord 57C, and solderless terminal 57D are always grounded.

When sheet D passes through inversion and insertion path 42 and is fed onto sheet glass 2, the surface of sheet D comes in contact with the tip of brush hair 57A and, thus, electrostatic charges adherent on the surface of sheet D flows from conductive brush hair 57A through brush holder 57B, ground cord 57C and solderless terminal 57D to the conductive member of the apparatus, and grounded. Thus, electrostatic charges are removed.

Given below is a description of the operation of belt keep roller 28.

Sheet D fed from sheet supply unit 10 passes through the inlet formed by the gap between conveyor belt 21 of conveyance unit 20 and stopper plate 3, and reaches the pressing position between sheet glass 2 and conveyor belt 21, conveyance of the sheet is continued by the frictional force of conveyor belt 21.

In the sheet feeding and conveyance process, during the CCW turning (forwardly running) of conveyor belt 21, belt keep roller 28 is held so that shaft end 28a is not caught by the tip 30a of rocking arm 30 (FIG. 4(B)), and ban be moved. With the running of conveyor belt 21, belt keep roller 28 is moved to the right away from step 3a of stopper plate 3. Shaft end 28a of belt keep roller 28, as being rotated to CCW direction, is moved along groove 29a of bearing element 29 to the right and comes in contact with the right edge of groove 29a, and movement to the right is stopped, but following rotation is continued.

Under this state, shaft end 28a of belt keep roller 28 is mated into and supported by shaft support section 29b of bearing element 29, and comes in contact with conveyor belt 21, being rotated following it without being lowered from bearing element 29.

Figures 1, 25:
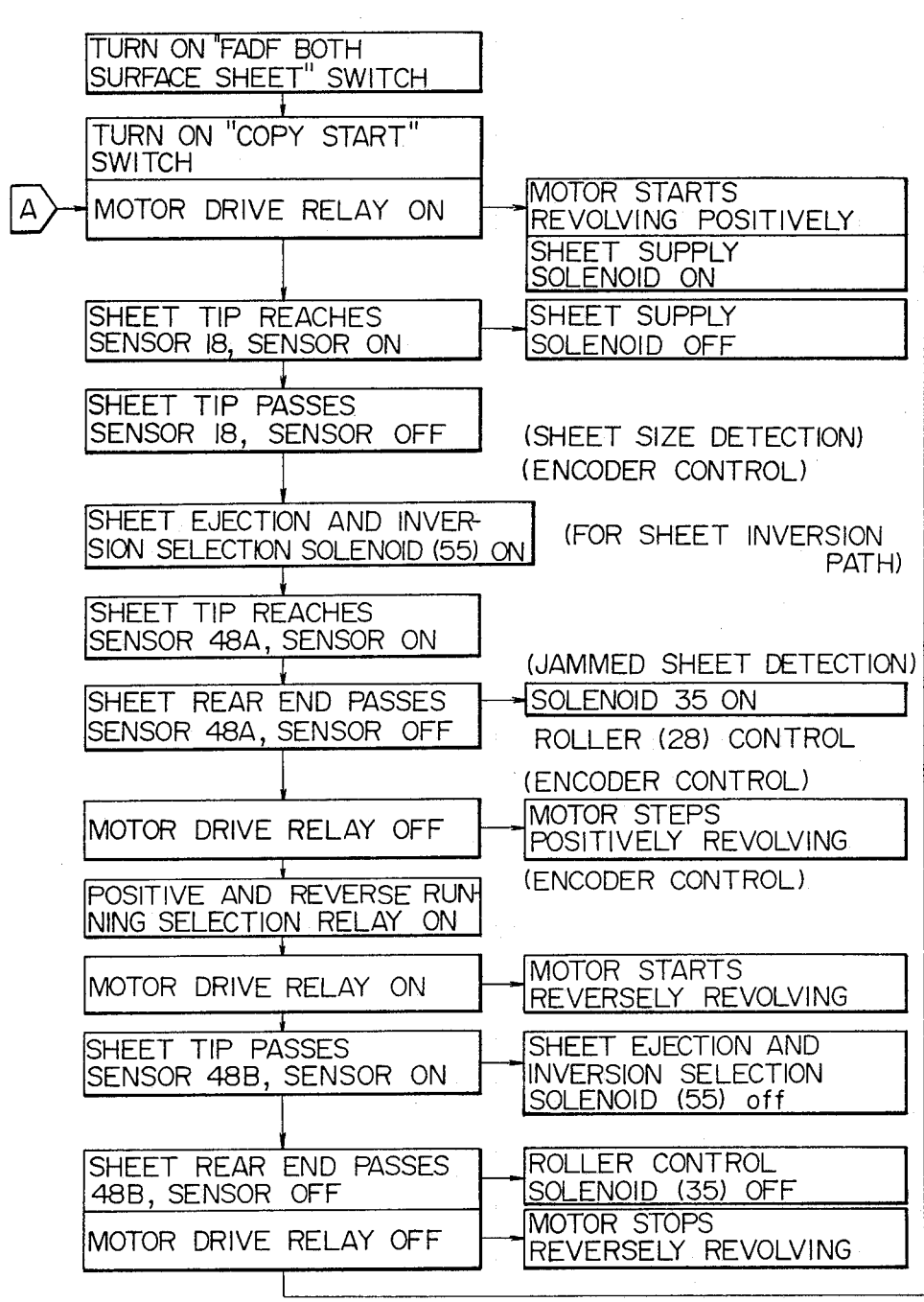
Figures 2, 25:
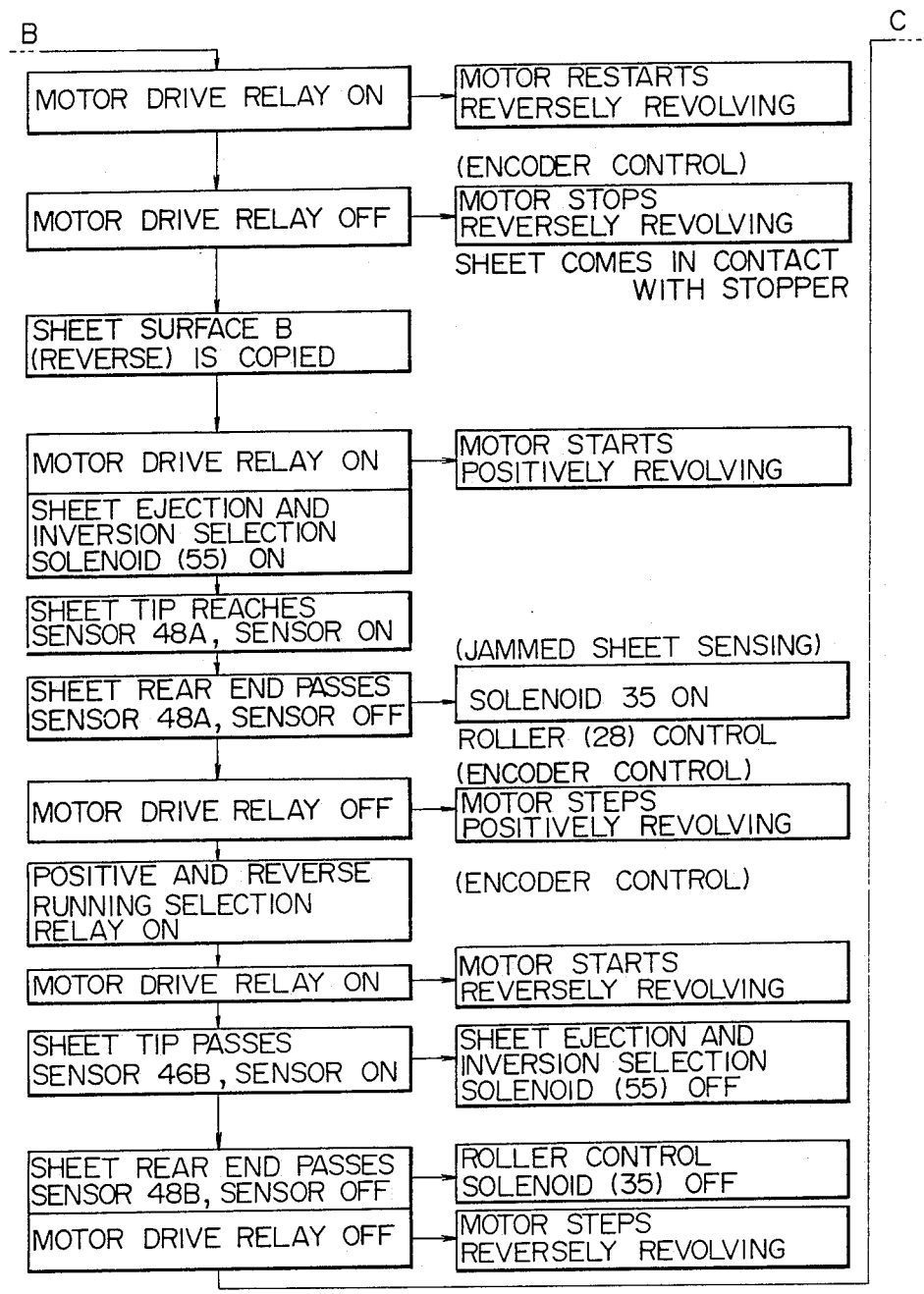
Figures 3, 25:
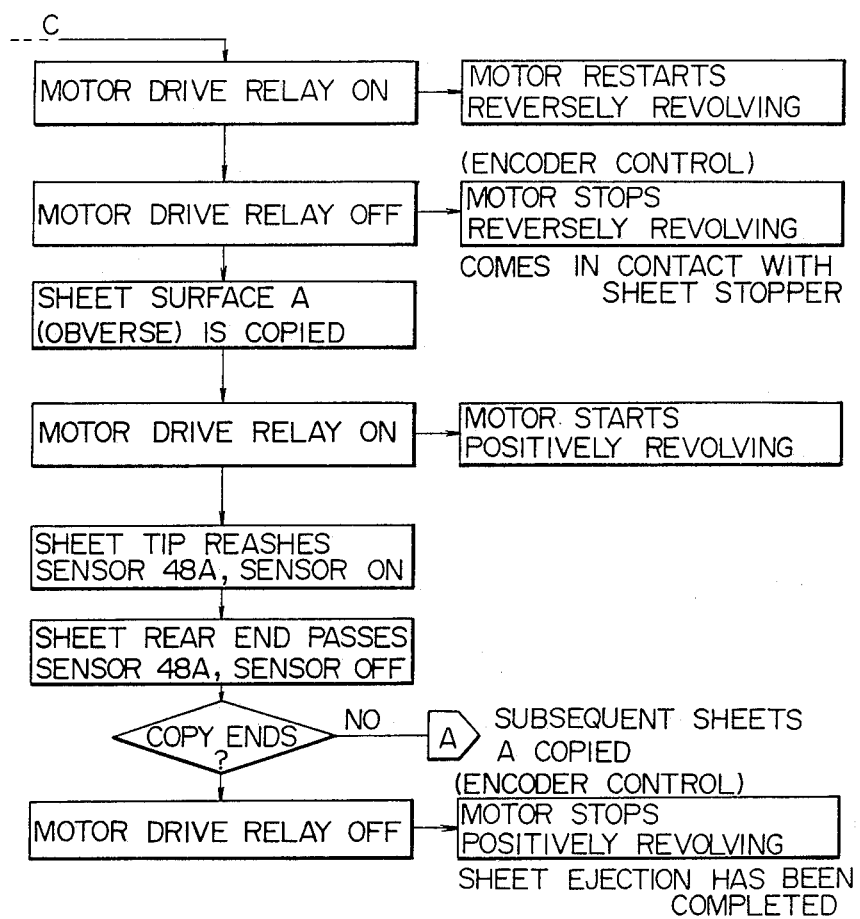
Figure 26:
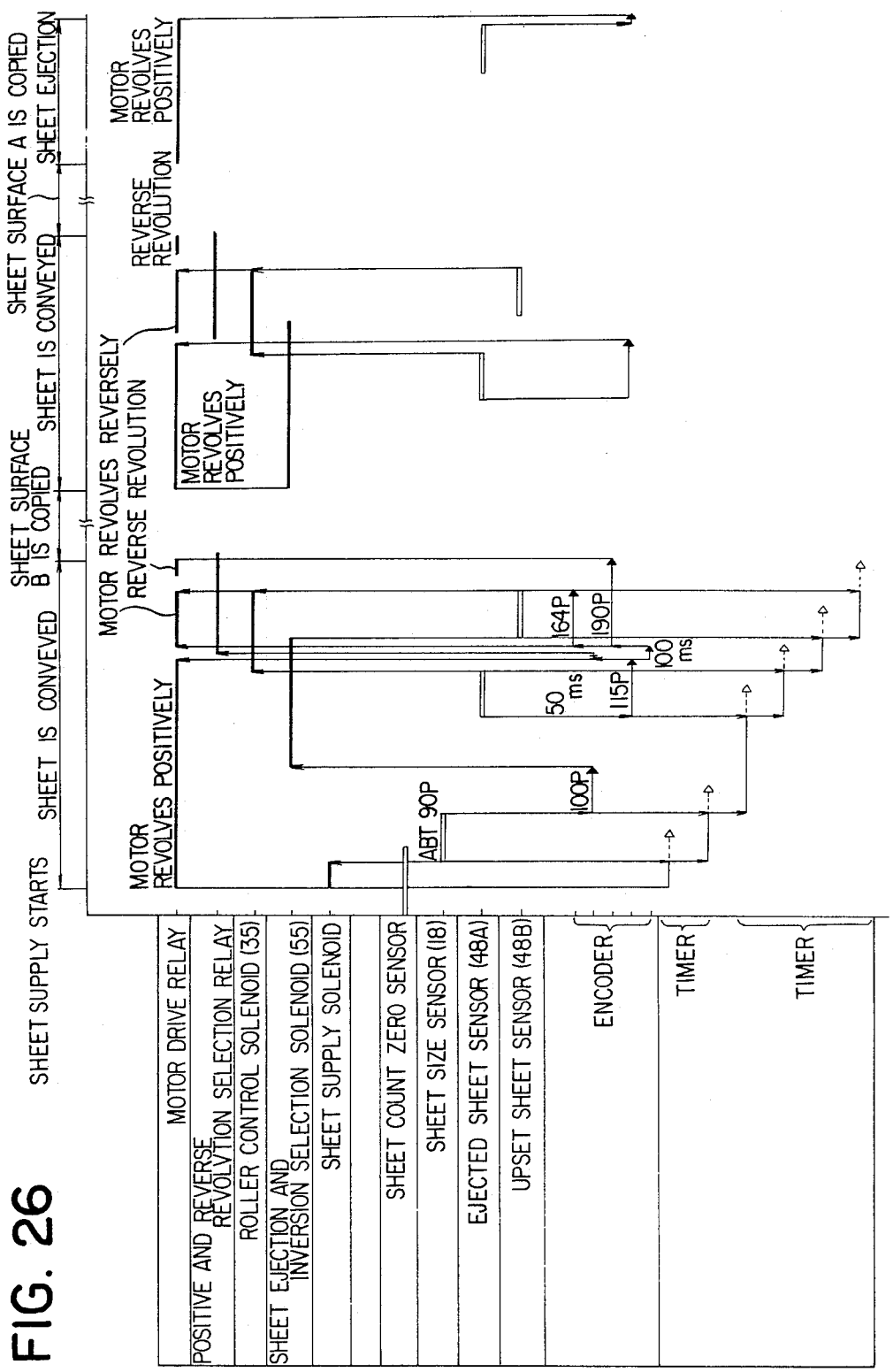
FIG. 26 provides a timing chart.
Figure 27:
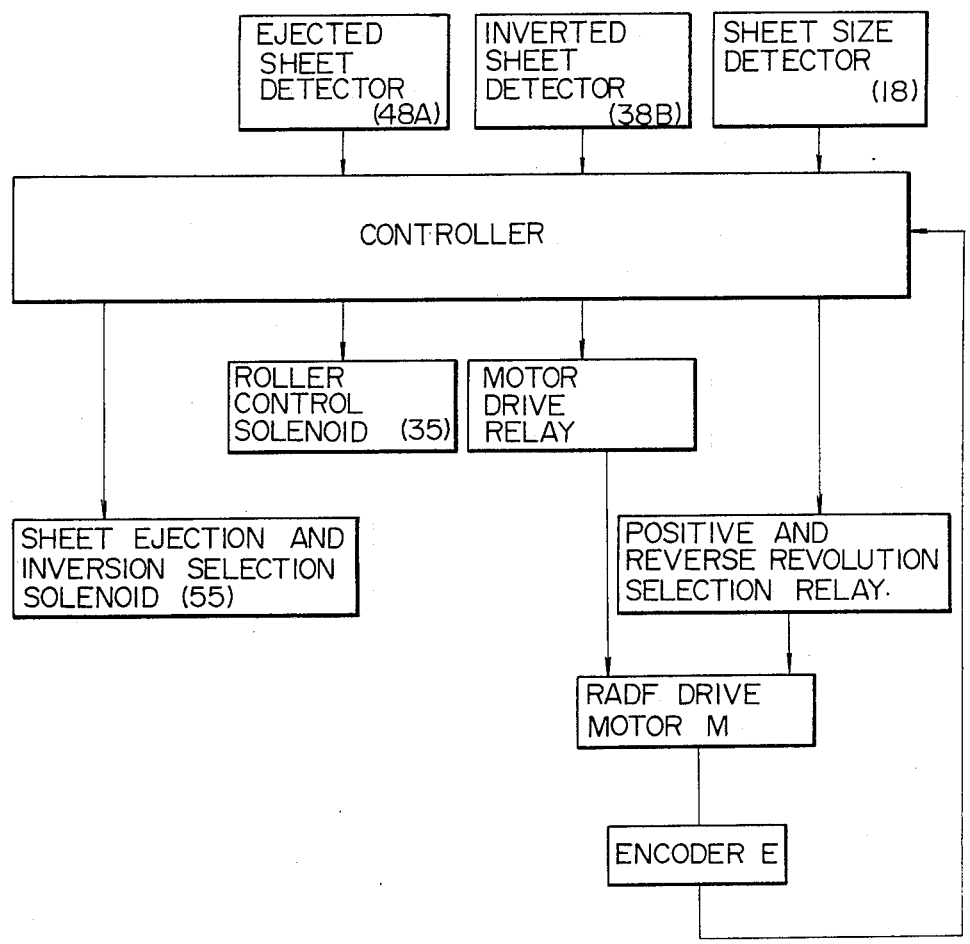
FIG. 27 provides a block diagram showing control over the sheet conveyance apparatus.

Given below is a detailed description of sheet inversion and conveyance by sheet conveyance apparatus equipped with belt keep roller 28 based on the flow chart of FIG. 25, the timing chart of FIG. 26, and the block diagram of FIG. 27.

Sheet D slid and conveyed on sheet glass 2 by conveyor belt 21 to the right, after its rear end has passed over sheet rear end sensor 18 and stopper plate 3, is further moved on sheet glass 2 to the right by the forward running of conveyor belt 21 and fed into sheet ejection and inversion unit 40.

When both surfaces of sheet D are copied, switching element 50, as shown in FIGS. 2 and 10(A), is turned to CCW direction to block the ejection opening, and the lower surface of the guide plate portion of switching element 50 inversion path 44 and the lower pressing position between sheet ejection roller 46A and lower roller 46C, and then further proceeds to inversion and feeding path 42. Because conveyor belt 21 is adapted to perform running reversely at this stage, separating roller 38 moves back to the left, the opening of inversion and insertion path 42 is made to be opened.

The route length of the inverting section from leading end sensor 48A to trailing end sensor 48B is arranged to be much greater than the maximum length of sheet B expected to be used.

As described above, a pair of sheet ejection rollers 46 and pair of inverting rollers 47 are always turned CCW irrespective of the running direction of conveyor belt 21 by means of intermediate rollers 25A and 25B incorporating uni-directional clutches K1 and K2, conveying sheet D to a predetermined direction.

The surface of sheet D is reversed by passing through feeding path 41, sheet ejection roller 46 and inverting roller 47 of sheet ejection and inversion unit 40, and inverting paths 43 and 44. Sheet D is conveyed by conveyor belt from inversion and insertion path 42 with its side B facing the upper surface of sheet glass 2.

During sheet inversion and conveyance, after the rear (trailing) end of sheet D has passed over leading end sensor 48A installed near above pair of sheet ejection rollers 46 in sheet ejection and inversion unit 40, the motor drive relay is activated a certain count after a sensing signal produced by loading sensor 48A, stopping the normal revolution of motor M shown in FIG. 3. Thus, the forward running of the conveyor belt is also stopped. For a while after the motor stop signal has been entered, the motor drive shaft is revolved by inertia. An encoder E directly coupled to said drive shaft counts the number of inertia pulses to the stop. For a predetermined short period of time (e.g. 100 ms) after the interval of inertia pulses has exceeded 10 ms because of reduced rpm of the drive shaft, conveyor belt is stopped. After the predetermined short period of time has passed, a reverse revolution ON signal is entered to motor M, which starts reverse revolution.

By that, the running of conveyor belt 21 is switched to CW direction (reverse running), while sheet ejection central roller 46A and inversion central roller 47A continue to turn to the same direction.

Right before the start of the reverse running of conveyor belt 21, after the sheet trailing end has been sensed by sensor 48A, a signal is entered to electromagnetic solenoid 35 shown in FIG. 9 (A), whereby plunger 35A is attracted and fixed pin 35B of plunger 35A engaged with elliptic hole 34C of rocking lever 34, thereby turning rocking lever 34 CW relative to a fixed central shaft 34b.

Because the shaft 34a of the other end of rocking lever 34 is engaged with elliptic hole 33a of link plate 33, the CW turn of rocking lever 34 leads to the CCW turn of integral link plate 33, rocking axis 31 and rocking arm 30 with respect to both shaft ends 31a. The CCW turn causes the engaging portion of rocking arm 30 to mate into and hold the step of belt keep roller 28, whereby the horizontal movement of belt keep roller 28 is restricted and belt keep roller 28 is held rotatably.

In the mode of copying both surfaces of sheet D after sheet rear end has been sensed by sensor 18, after a predetermined count has passed, the solenoid for actuating sheet conveyance switching element 50 is energized, as shown in FIGS. 2 and 10(A), switching element 50 is turned CCW to close sheet ejection path 45, while the lower surface of switching element 50 guides sheet D fed from the upper pressing position between pair of sheet ejection rollers 46 to lower left direction. Sheet D proceeds to inversion path 43, returns at pair of inverting rollers 47, passes through inverting path 44 and the lower pressing position between pair of sheet ejection rollers 46, and further proceeds along inversion and insertion path 42 to sheet glass 2. In the sheet path, de-energizing brush 57 comes in contact with the surface of sheet D to ground and remove electrostatic charge thereon.

During the reverse running of conveyor belt 21, belt keep roller 28 near the left edge of sheet glass 2 is engaged with rocking arm 31, rotated at the position away from stopper plate as shown in FIG. 9(A). At the same time, separating roller 38 near the right end of sheet glass 3 is rotated at a position which provides the opening of inversion and insertion path 42 to allow sheet D to proceed onto platen glass 2.

Sheet D, by passing through the inverting path of sheet ejection and inversion unit 40, is reversed; the reverse, or the surface B, is made to face the upper surface of sheet glass 2, the reversed sheet D is further fed backwardly onto sheet glass 2 by conveyor belt 21.

As soon as the rear end of sheet D passes rear end sensor 48B, a rear end sensing signal activates the motor drive relay to stop the reverse revolution of motor M. Thus, the reverse running of conveyor belt 21 is stopped; so, belt keep roller 28 turned following conveyor belt 21 is stopped.

After belt keep roller 28 has stopped rotating, a drive signal is entered into solenoid 35 and the shaft position control of belt keep roller 28 is released.

Before this control release, belt keep roller 28, as shown FIG. 9(A), is rotated following conveyor belt 21, at the position where shaft end 28 load on the shaft support section of bearing element 29. Between the upper surface of sheet glass 3 and conveyor belt 21 which correspond to the position underneath belt keep roller 28, a slight gap g is formed, separating both. Since conveyor belt 21 pressed onto the upper surface of sheet glass 2 by pressing rollers 27A and 27B is not in contact with sheet glass 2 at the position of belt keep roller 28 located near stopper plate 3, the leading end of sheet D conveyed toward stopper plate 3 by the reverse running of conveyor belt 21 comes appropriately in contact with step 3a of stopper plate 3 so that, by excessive pressing conveyance force, troubles such as damaged sheet edges, creases and improper positioning for copying may be prevented from occurring.

The access of the top end of sheet D to step 3a is assured by counting up a certain count set in advance on the basis of the sheet pass signal of rear end sensor 48B and a sheet size sensing signal.

Upon receipt of this sheet access signal, the reverse running of conveyor belt 21 is stopped temporarily by the temporary stop of reverse motor revolution and then the rotation of belt keep roller 28 following conveyor belt 21 is stopped, thereafter a signal is entered into electromagnetic solenoid 35, plunger 35A is projected as shown in FIG. 9(B). Thus, rocking lever 34 is turned CCW with respect to a central turn axis 34b, rocking arm 30 to turn CW with respect to rocking axis 31 via link plate 33 engaged therewith, whereby the engagement of rocking arm 30 with belt keep roller 28 is released and the axis position control of belt keep roller 28 is released, making conveyor belt 21 movable. During the temporary stop of the reverse running of conveyor belt 21 by the temporary stop of reverse revolution of motor M, the restriction on belt keep roller 28 is released and, after a short period of time has passed, the motor drive relay is activated again and the reverse revolution of motor M is resumed, restarting the reverse running of conveyor belt 21.

Roller surface 28c of belt keep roller 28 comes in contact with the inner surface of conveyor belt 21, which runs reversely, then roller surface 28c is turned CW following conveyor belt 21, while shaft end 28a is guided along the groove of bearing element 29, and moved to the left, nearing the left edge of the groove.

When belt keep roller 28 is moved to the left, its shaft end 28a is separated from groove 29a of bearing element 29, being lowered under the lower opening and being moved to the position shown in FIG. 9(B).

In the Figure, conveyor belt 21 is pressed through inner surface thereof by roller surface 28c of belt keep roller 28 and the outer surface of conveyor belt 21 comes slightly in contact with step 3a of stopper plate 3, closing gap g, so that the tip of the sheet conveyed reversely comes securely in contact with step 3a of stopper plate 3 and stops, not overrunning into the sheet supply unit. After one end of sheet D has come in contact with stopper plate 3, motor drive is stopped and the reverse running of conveyor belt 21 is stopped, halting sheet D.

Sheet D set at the correct stop position is pressed to fit on sheet glass 2 by conveyor belt 21 with a plurality of pressing rollers 27A and 28B, and then the surface B (reverse) is exposed to light, followed by the known process, where images are formed and transferred onto recording paper. Thus, the copying for one surface is completed. In that copy operation, the positional relation between the image on recording paper and the original picture on the sheet is held correctly.

After the completion of the light exposure for the reverse surface of sheet D, conveyor belt 21 is run into normal (CCW) direction, and sheet D is transferred through feeding path 41 into sheet ejection and inversion unit 40. As mentioned above, the transferred sheet D is conveyed through pair of sheet ejection rollers 46, to inverting paths 43 and 44 for inverting the surface of sheet D, and further conveyed through pair of inverting rollers 47, via inversion and insertion path 42 onto sheet glass 2. Here, conveyor belt 21 run reversely (backwardly), during which belt keep roller 28 is restricted by solenoid 35. The above mentioned operation in the temporary stop right before the end of reverse running and the release of the restriction on belt keep roller 28 also is applied here.

The surface A (obverse) of sheet D conveyed onto sheet glass, whose tip comes in contact with step 3a of stopper plate 3, is set in predetermined position and is exposed to light as the image forming process by the copier main body. After the reverse surface of sheet D has been exposed to light, conveyor belt 21 is run normally (forwardly), and sheet D transferred from feeding path 41 is held by pair of sheet ejection rollers 46, passes above the upper surface of switching element 50 which closes the inverting path, and is delivered via an ejecting path 45 to an ejecting tray 80. With the repetition of copying, sheets D are stacked in order.

Given below is a detailed description of a preferred embodiment of sheet conveyance switching element (hereinafter called switching element) provided by the present invention. Switching element 50 is integral with end support shaft section 50a, which is arranged rotatably between both side plates of sheet conveyance apparatus.

Figure 16:
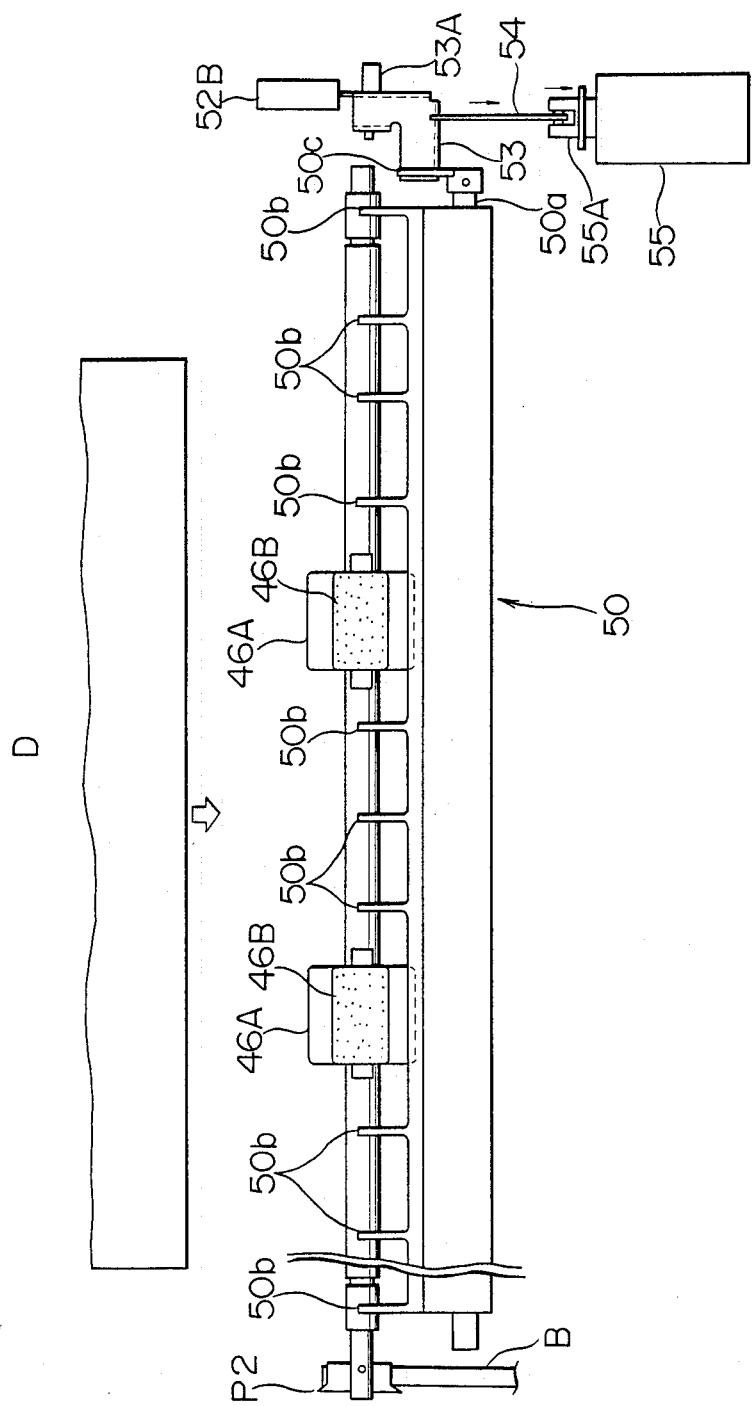

As shown in FIG. 16, between both end support shaft sections 50a, a plurality of guide plate sections 50b is installed integrally which feeds sheet D into sheet ejection path 45 or inverting paths 43 and 44. Guide plates 50b are arranged coaxially in parallel at the interval corresponding to the maximum width of sheet D passing through the above paths; guide plates 50b, which are located on both sides of the roller section of sheet ejection central roller 46A, are held at certain intervals.

Figure 15:
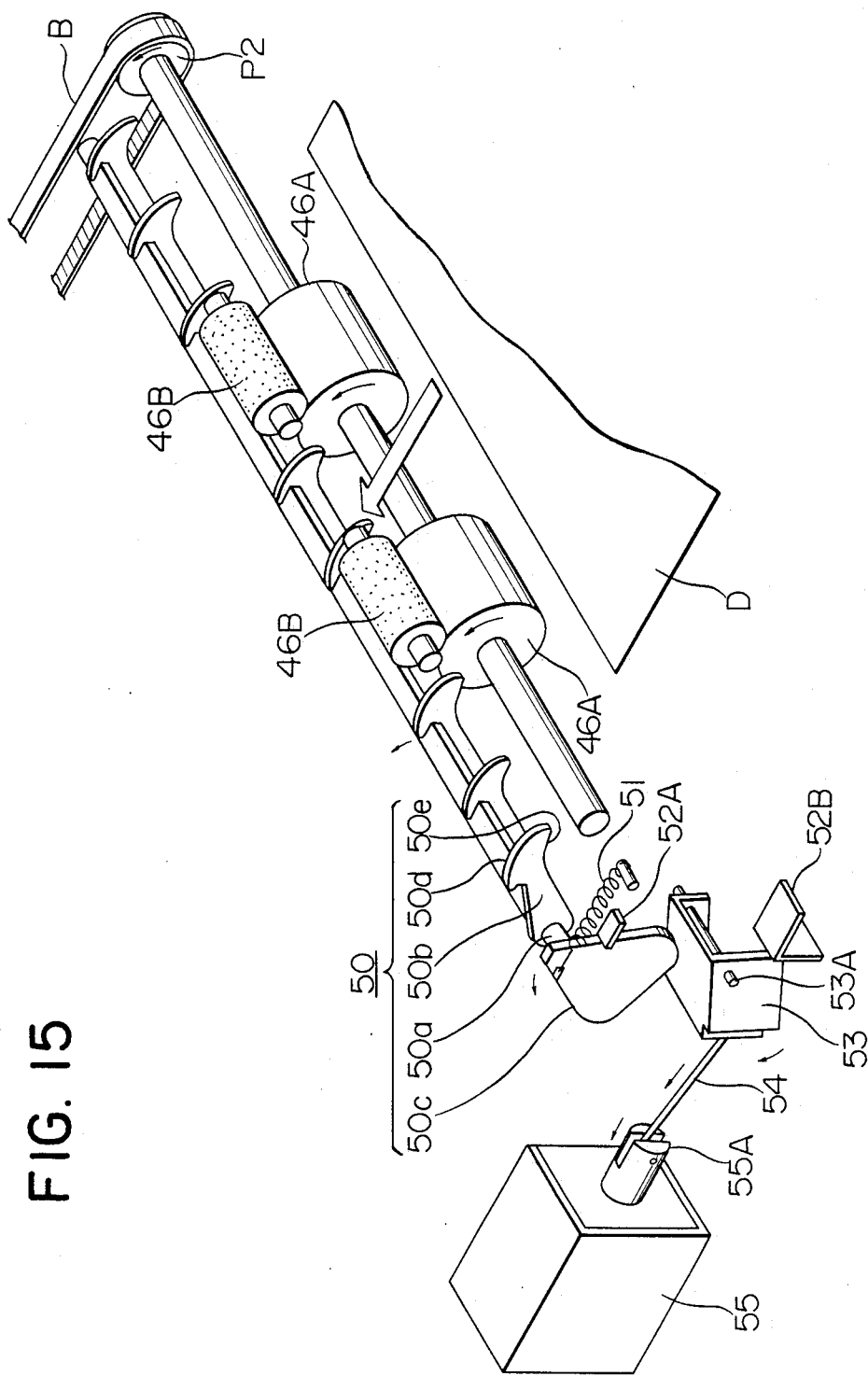
FIGS. 15, 16, and 17 provide oblique, plan, and side views, respectively, showing the structure of the sheet conveyance switching element, essence of the present invention.

As shown in FIG. 15, the upper surface of guide plate 50b forms a projected curved section 50d projecting upward. When switching element 50 is in the sheet ejection mode (FIG. 10(B)), projected curved section 50d forms an tilted surface obliquely rising to the downstream side in relation to sheet ejection direction from the press position between sheet ejection central roller 46A and upper roller 46B, top portion of the curved surface being higher than the press position.

Sheet D fed from feeding path 41 to sheet ejection rollers 46A and 46B is fed out in horizontal direction from the pressing position by the rotation of both rollers 46A and 46B coming in press contact with each other; sheet D rises obliquely along projected curved section 50d of guide plate 50b, passes the curved top, and is ejected to external ejection tray 80 via sheet ejection path 45.

In the ejection process, sheet D fed out tightly from the pressing position between sheet ejection rollers 46A and 46B, when it passes projected curved section 50d of guide plates 50b located on both sides of sheet ejection roller 46A, has its surface wave-like curved in parallel to the longitudinal direction, whereby strength (stiffness) is given along the sheet D movement direction.

Thus, sheet D proceeds along projected curved section 50d and is ejected to the delivery tray, so that the rear end of sheet D does not stay near sheet ejection path 45, solving the problem of improper sheet ejection.

On the other hand, the lower curved surface of guide plate 50b forms a depressed curved section 50e, providing a guide surface when sheet D is introduced into inverting path 43 from the pressing position of sheet ejection central roller 46A, as shown in FIG. 10(A).

At one shaft end of support shaft section 50a, a plate cam 50c is secured integrally. Sheet conveyance switching element 50 comprising support shaft section 50a, guide plate 50b, and plate cam 50c is molded integrally of resin.

Figure 17:
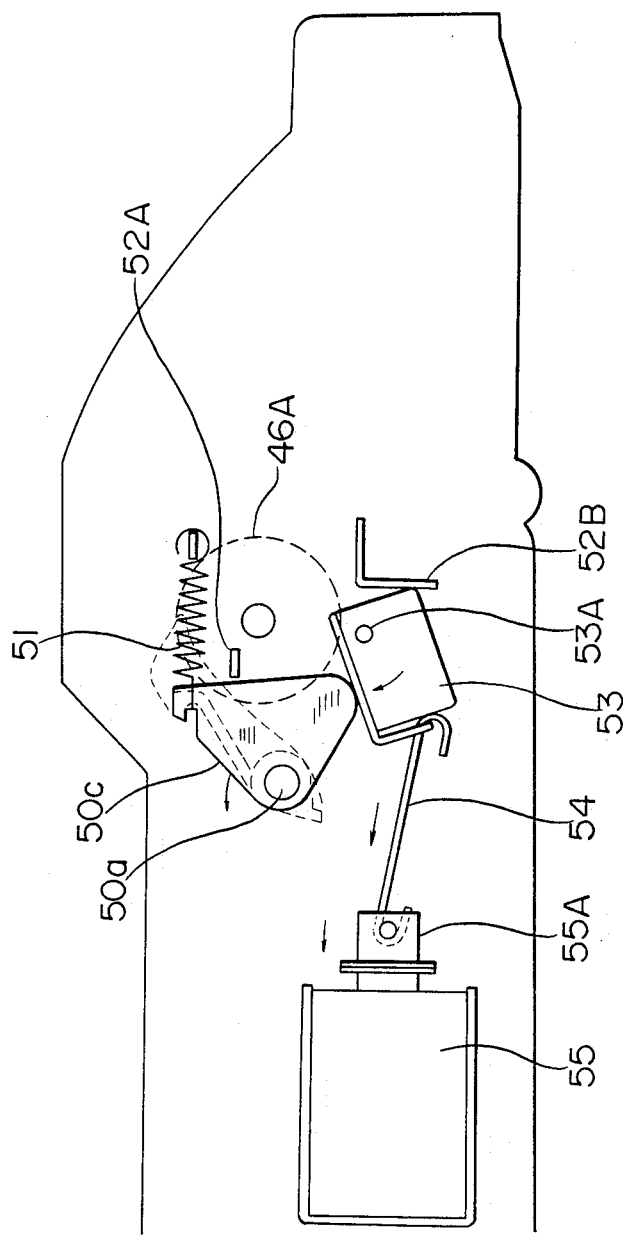

As shown in FIG. 17, a coil spring 51 is hooked at the upper edge of plate cam 50c, providing pulling force, and a stopper 52A is used for stopping plate cam 50c. Underneath the projecting portion of plate cam 50c, rocking element 53 is secured rotatably around an axis 53A. 52B is a stopper which comes in contact with an edge of rocking element 53 to stop rocking motion. Between the left edge projection of rocking element 53 and the tip of plunger 55A of solenoid 55, a hook 54 is set for interconnection.

When sheet D is conveyed from feeding path 41 to inverting path 43 (FIG. 10(A)), a sheet inversion signal is entered into solenoid 55, and plunger 55A is attracted to the arrow direction shown in FIGS. 16 and 17, whereby rocking element 53 is rocked to CW direction around axis 53A and the lower edge of plate cam 50c of switching element 50 in contact with the upper surface of rocking element 53 is rocked to CCW direction. By the rocking of plate cam 50c, guide plate 50b of switching element 50 is rocked to CCW direction away from the circumference of sheet ejection central roller 46A, and the sheet inversion path is opened, as shown in FIG. 10(A).

When copied sheet D is to be ejected to tray 80, sheet D enters feeding path 41 from the right edge of sheet glass 2 by the conveying force of conveyor belt 21, rises along feeding path 41, is caught by sheet ejection rollers 46A and 46B, is ejected from the ejection outlet to the outside, and is stacked on ejection tray 60 with the obverse facing upward.

At that time, solenoid 55 is de-energized, with plunger 55 being at the original projected position. Switching element 50 is rocked to CW direction by the pulling force of coil spring 51, enters lower side of the circumference of sheet ejection central roller 46A, thereby closing the sheet inversion path and opening sheet ejection path 45 for guiding sheet D to the ejecting outlet.

In sheet ejection path 45, a de-energizing brush 58 having almost the same shape as de-energizing brush 57 is secured on the cover element of sheet conveyance apparatus, touching sheet to be ejected to the outside to remove electrostatic charges thereon.

Figure 18:
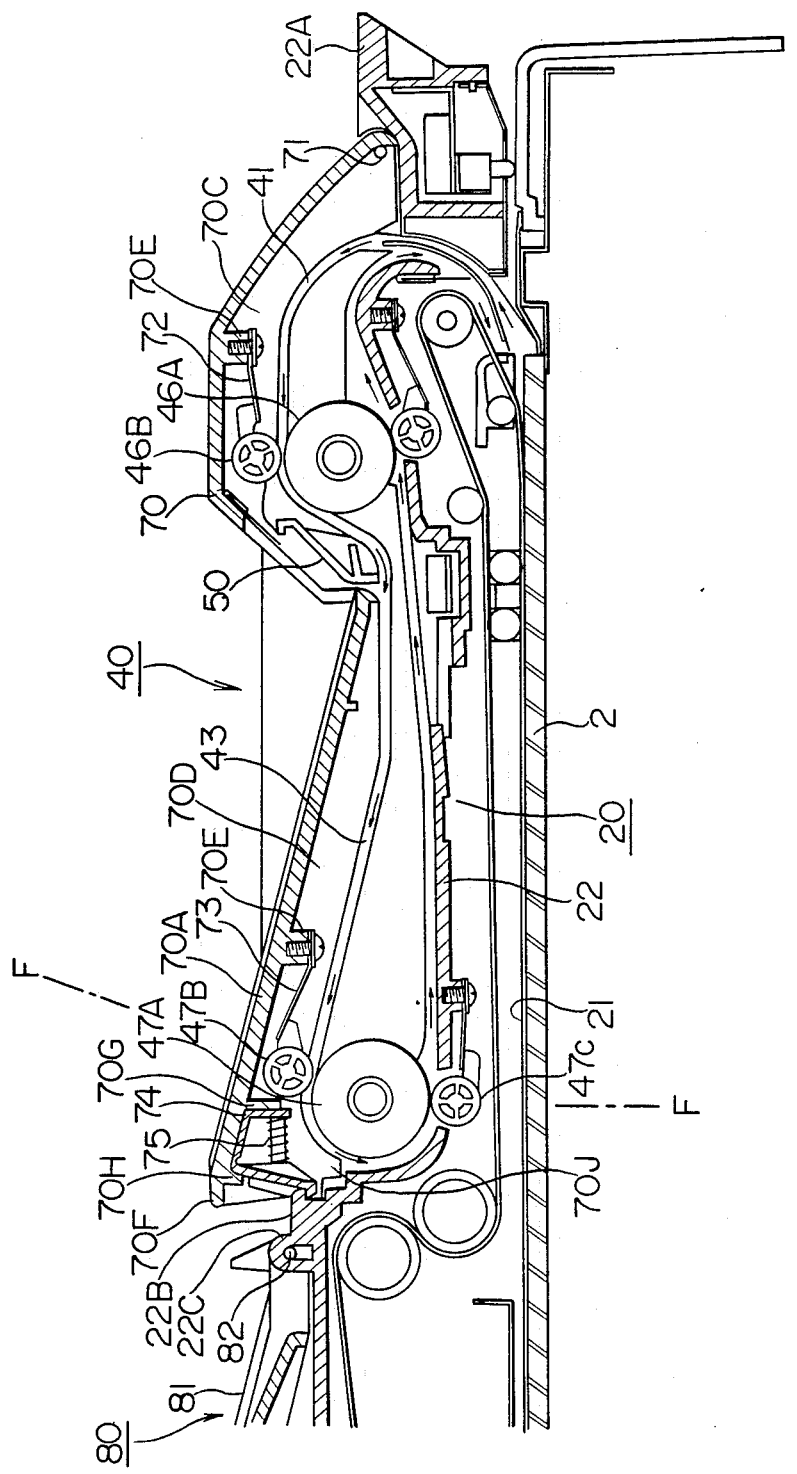
FIG. 18 provides a cross sectional view of the sheet ejection and inversion unit shown in FIG. 10 (A) along the dashed line.
Figure 19:
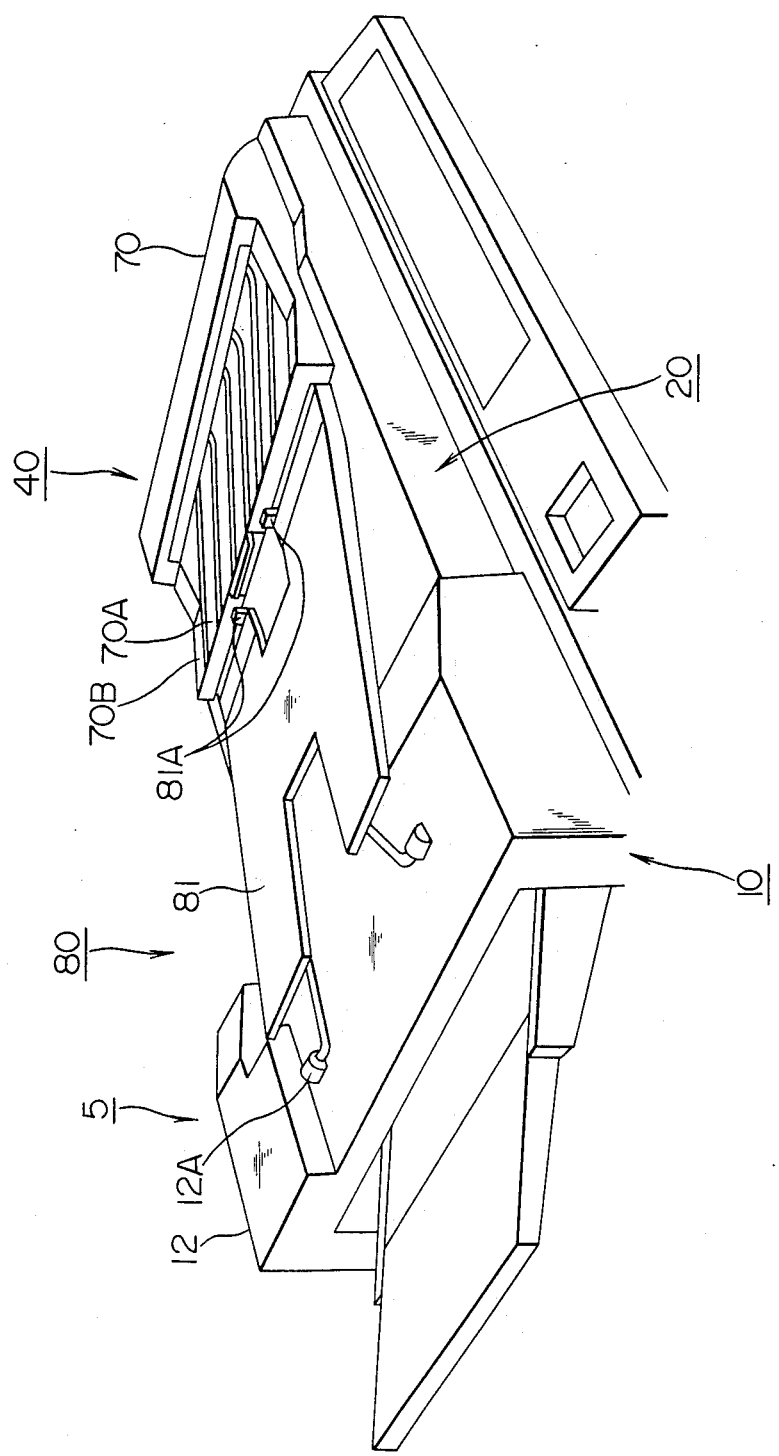
FIG. 19 provides an oblique view of the sheet conveyance apparatus with the cover closed.
Figure 20:
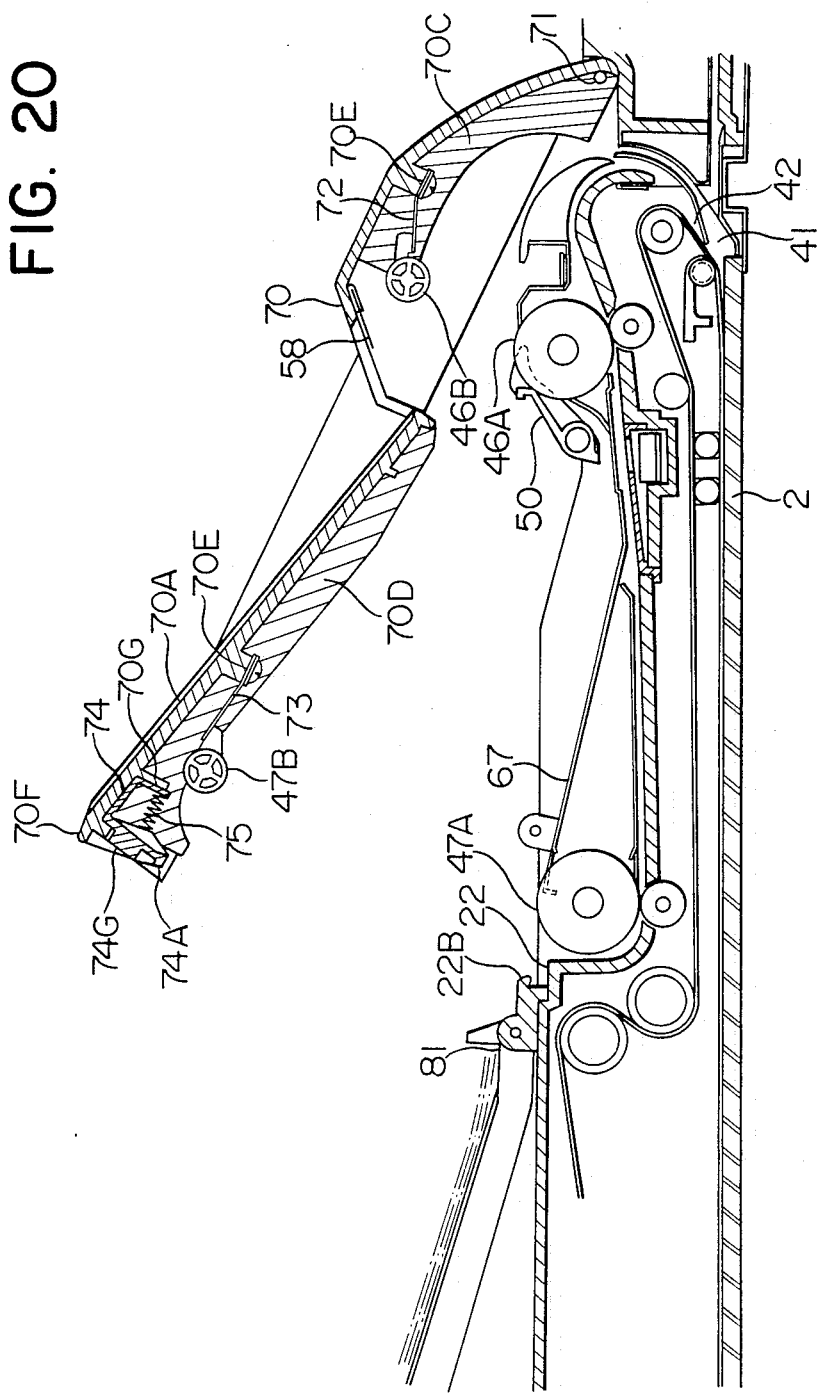
FIG. 20 provides a cross sectional view of the sheet conveyance apparatus with the sheathing element of the sheet ejection and inversion unit opened.
Figure 21:
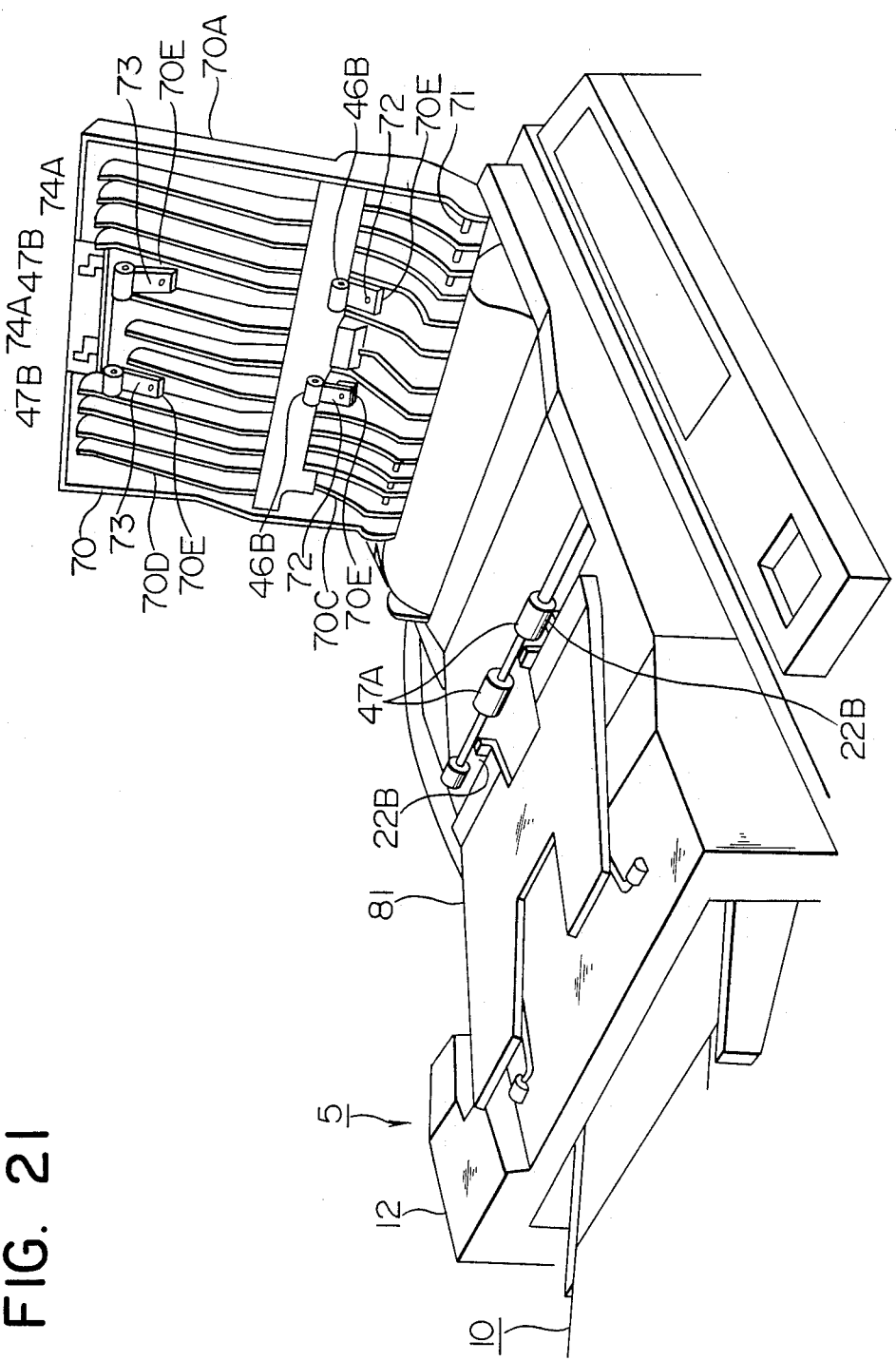
FIG. 21 provides its obique outside view.

FIGS. 18 through 24 show the concrete configuration of the sheet ejection and inversion unit provided by the present invention. FIG. 18 provides another cross sectional view of sheet ejection and inversion unit 40 different from the above-mentioned figures. FIG. 19 provides an oblique view of sheet conveyance apparatus with the cover closed. FIG. 20 provides a cross sectional view of the sheet conveyance apparatus with the element of sheet ejection and inversion unit 40 opened. FIG. 21 provides an oblique outside view of FIG. 20.

The sheet inversion and ejection unit 40 comprises a pair of sheet ejection rollers 46, a pair of inverting rollers 47, a sheet conveyance switching element 50, and a guide plate 67. The sheet ejection and inversion unit 40 is mounted on housing 22 of conveyance unit 20 in sheet conveyance apparatus 5 and is covered by outer-cover element 70, except the outlet opening of sheet ejection path 45.

The external upper surface located at the left of the outlet opening of outer-cover element 70 forms an almost flat slope, providing sheet ejection tray 70A that can receive and stack ejected sheets.

On the surface of sheet ejection tray 70A, a plurality of strip-like projections 70B is formed in parallel along the sheet movement direction to help the movement of a sheet and reduce friction and adhesion with a sheet.

Projection 70B, e.g., has a width of about 2 mm and a height of 1 to 3 mm. The intervals between projections 70B is determined appropriately in accordance with the sizes of a sheet to be conveyed.

Sheet ejection tray 70A having projection 70B forms a slope being higher at the downstream ejection side. During sheet ejection, a sheet delivered from the press position between sheet ejection central roller 46A and follower roller 46B along the projected curved section above sheet conveyance switching element 50 of sheet ejection path 45 to the outlet opening is put on projection 70B of sloped sheet ejection tray 70A and rises along the slope. As soon as the sheet is ejected from the press position in the normal sheet ejection speed, the rear end of the sheet is put on projection 70B, retreated, and is dropped. It comes in contact with the back of sheet conveyance switching element 50 and is stopped. The rear ends of sheets are arranged, with the sheets stacked.

Inside of outer-cover element 70, a plurality of guide plates 70C for feeding a sheet sent out of feeding path 41 to the press position between sheet ejection central roller 46A and upper follower roller 46B, and a plurality of guide plates 70D for feeding the sheet from the above press position to the press position between inversion central roller 47A and upper follower roller 47B are formed integrally with each other.

Guide plates 70C and 70D have a thickness of about 2 mm. The intervals of the guide plates are predetermined appropriately in accordance with the sizes of sheets to be conveyed.

The clearance height of feeding path 41 with guide plate 70C, and that of inverting path 43 with guide plate 70D and movable guide plate 67 are set at certain proper values so that a sheet may be smoothly guided and transmitted.

On the inner wall of outer-cover element 70, four pieces of mounting bases are projected, on which plate spring elements 72 and 73 are screwed. At plate spring element 72, upper follower roller 46B is supported rotatably. At plate spring element 73, upper follower roller 47B is supported rotatably.

Follower rollers 46B and 47B, when outer-cover element 70 is closed with respect to hinge axis 71 for use, come in contact with the circumferences of sheet ejection central roller 46A and inversion central roller 47A and are pressured by the elastic force of plate spring elements 72 and 73, forming press contact condition.

Below a knob 70F at the top of the left edge of outer-cover element 70, a movable hook element 74 is secured on the inner side of outer-cover element 70. The left wall of hook element 74 can be rocked by a thinly formed bent section, and is biased externally by coil spring wound on an inner boss. The bottom end of the left wall of hook element 74 provides an engaging pawl 74A, which is engaged/disengaged with/from a fixed hook 22B formed integrally with part of housing 22.

When a sheet is jammed in the sheet conveyance path in sheet ejection and conversion unit 40, or when component elements in unit 40 are repaired or inspected, engaging pawl 74A is disengaged from fixed hook 22B while catching knob 70F of outer-cover element 70 by pressing the front wall 74G of movable hook element 74, thereby opening outer-cover element 70. Subsequently, by turning outer-cover element 70 with respect to hinge axis 71 for opening as shown in FIGS. 20 and 21, inverting path 43, feeding path 41, etc. can be accessed.

Figure 22:
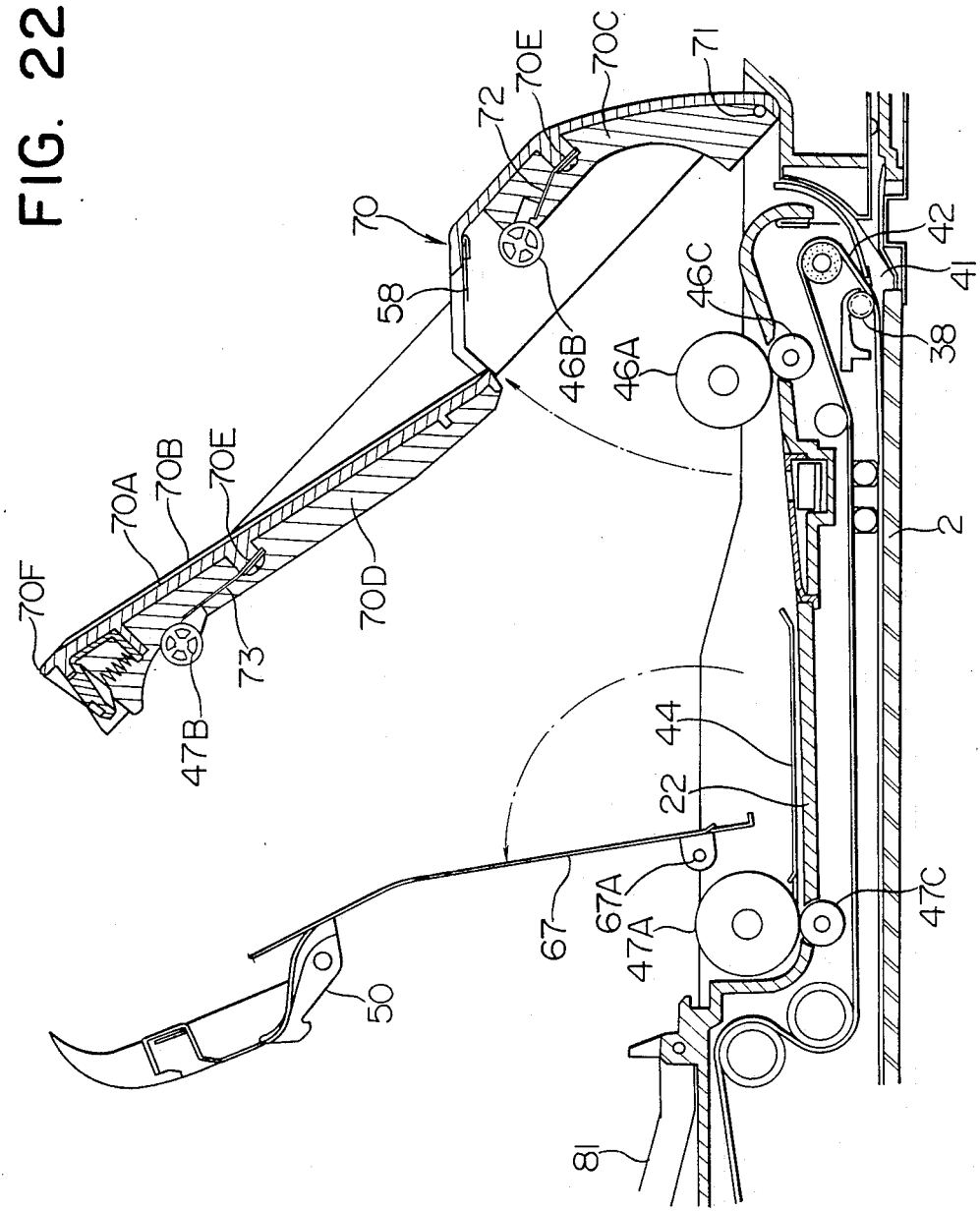
FIG. 22 provides its cross sectional view with the inner movable guide plate opened.

Next, by turning movable guide plate 67 to CCW direction with respect to hinge axis 67A as shown by dashed lines in FIG. 22, the overall circumference of sheet ejection central roller A, most part of inverting path (sheet inversion and conveyance path) 44 near the upstream and downstream sides of sheet ejection central roller 46A, the opening of inversion and insertion path 42 above separating guide plate 49, the opening of feeding path 41 above return guide plate 56, etc. can be accessed.

Thus, a jammed sheet can be taken out easily, rapidly and safely without being damaged. It is also easy to inspect and repair the inversion and conveyance element. After the end of taking out a sheet and inspecting a component, sheet conveyance can be resumed immediately by turning and resetting the inner guide element and the outer guide element.

Figure 23:
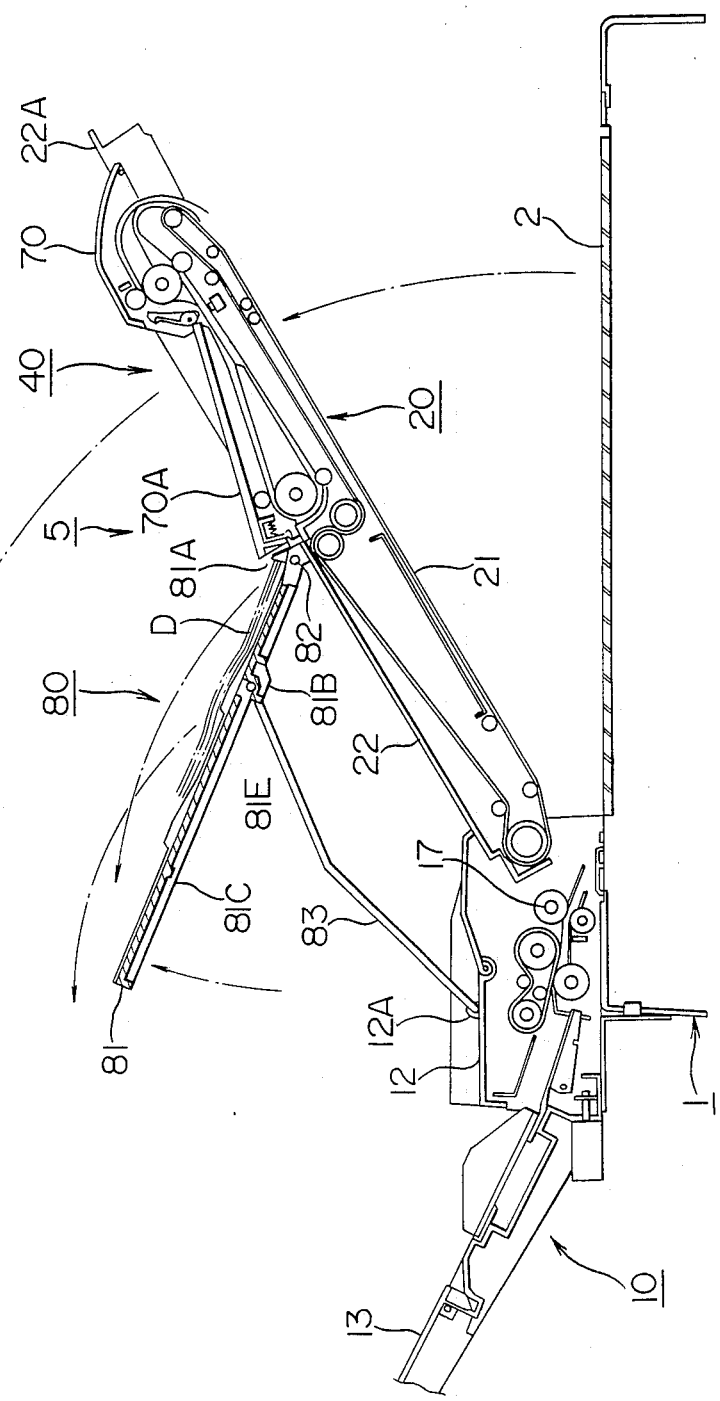
FIG. 23 provides a cross sectional view with part of the sheet conveyance apparatus lifted and the sheet support glass surface opened.

FIG. 23 provides a cross sectional view with part of the sheet conveyance apparatus lifted and the upper surface of sheet glass 2 opened.

When a special sheet is put on sheet glass 2 for copying, a book-like sheet is placed for copying, a sheet staying on sheet glass 2 because improper conveyance is taken out, or the surface sheet glass 2 is cleaned, by lifting knob 22A projected at one end of housing 22 of conveyance unit 20 to turn to CCW direction as shown by dashed lines, the upper surface of sheet glass 2 can be accessed.

This opening operation permits conveyance unit 20 and sheet ejection and inversion unit 40 to be declined with respect to the axis of sheet supply roller 17, and a sheet ejection tray 70A of outer-cover element 70 also then become declined. Simultaneously, a sheet ejection tray support rod 83 is turned to CCW direction with respect to shaft support section 12A located at the top of cover element 12 of sheet supply unit 10 so that the top end of support rod 83 forces the bottom of sheet ejection dish 81 of ejection tray 80 upward. Thus, sheet ejection dish 81 is turned CW with respect to support shaft section 82 located at housing 22, sheet ejection dishes 70A and 81 become declined in V shape.

With sheet D placed on sheet ejection dish 81 prior to opening, sheet D comes in contact with projection 81A and stops, as mentioned above, and is caught by member 22 near the boundary of sheet ejection dish 70A and sheet ejection dish 81. This does not make it difficult to take out a sheet, nor damages a sheet.

Figure 24:
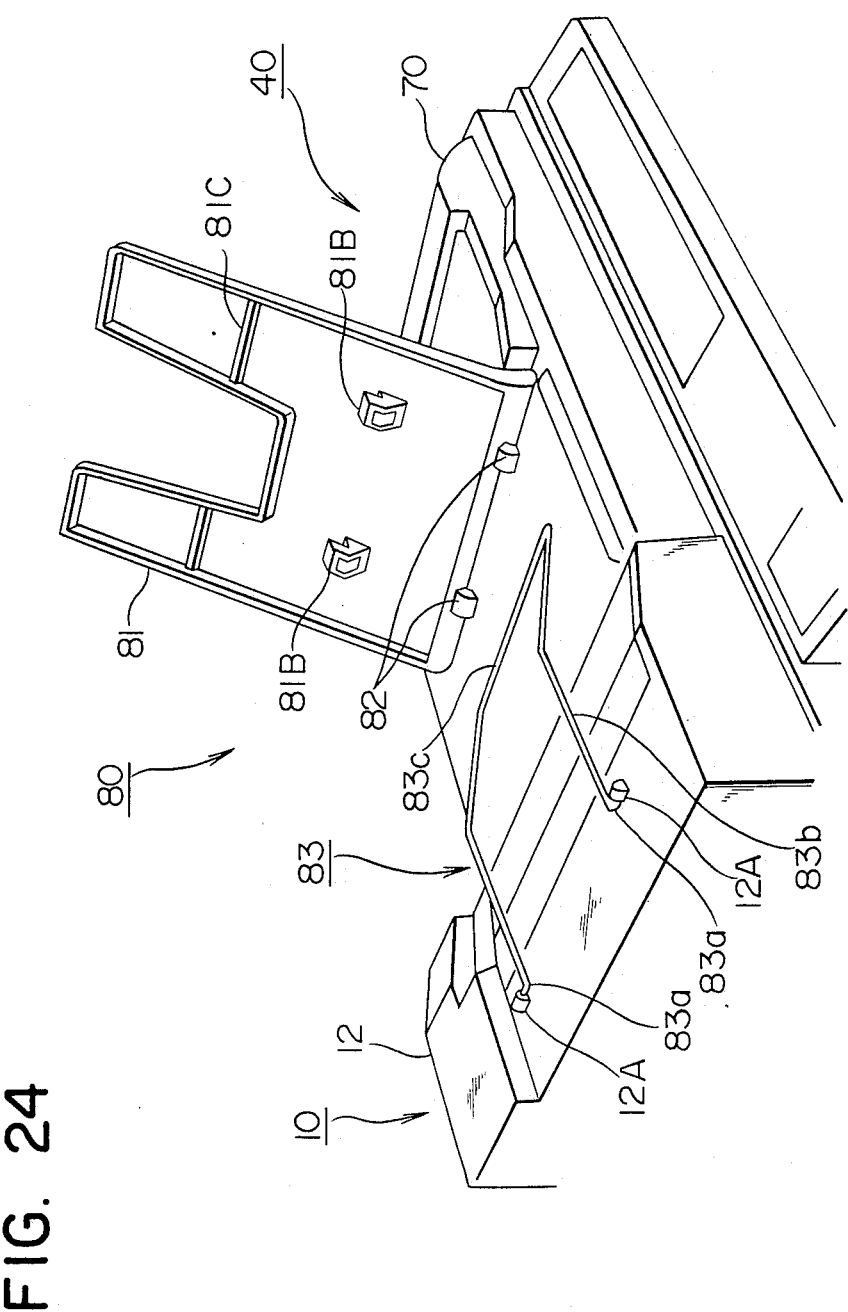
FIG. 24 provides an oblique view with the sheet ejection dish opened.

FIG. 24 provides an oblique view of the sheet conveyance apparatus with sheet ejection dish 81 and the support element removed.

At part of the upper surface of cover element 12 that protects sheet supply unit 10, two shaft support sections 12A are installed integrally. Into the bearing hole of shaft support section 12A, the tips of both foot sections 83a of one edge of support element (sheet ejection dish support rod) 83 are mated. Support element 83, which is made by bending a round metal rod, is elastic and can be forced easily into the bearing hole of fixed shaft support section 12A.

Arm section 83b of support element 83 is bent at an obtuse angle. During the use of the sheet conveyance apparatus, upper arm section 83b comes in contact with a bottom projection 81C of sheet ejection dish 81.

The upper part of support element 83 provides a coupling section 83c, whose both ends are mated into a receiver section 81B of the sheet ejection dish described later.

At receiver section 81B of sheet ejection dish 81, a pocket section 81E having an opening is formed. Sheet ejection dish 81 is made of ABS resin, etc. The opening is deformed elastically by press coupling shaft section 83c of support element 83 thereto, and accepts coupling shaft section 83c. Coupling shaft section 83c of support element 83 is coupled to pocket section 81E.

To disengage sheet ejection dish 81 and support element 83, by lifting part of the sheet conveyance apparatus for declining it as shown in FIG. 23 and by pulling out support element 83 somewhat strongly, thereby coupling shaft section 83c is disengaged easily from pocket section 81E, as shown in FIG. 23.

If a sheet to be conveyed automatically sticks on sheet glass 2 or when sheet glass or conveyor belt 21 is cleaned, lift a knob 22A located at the right edge of housing 22 of conveyance unit 20 and turn it CCW so that housing 22 stands almost perpendicularly. Conveyor belt 21 also stands perpendicularly, with sheet glass 2 able to be accessed. Thus, conveyance unit 20 and sheet ejection and inversion unit 40 are declined with respect to the shaft of sheer supply roller 17 and stand perpendicularly.

Under such perpendicular state, support shaft section 82 above housing 22 is moved along the dashed lines with respect to sheet supply roller 17. Thus, the right end of the sheet ejection dish is held by support shaft section 82 and turned, coupling shaft section 83c of support element 83 held in receiver section 81B located near the center of sheet ejection dish 81 is moved along the dashed line, and arm section 83b of support element 83 is turned and moved with respect to shaft support section 12A, being stopped. In this turning process, the tilt angle of sheet ejection dish 81 is not changed substantially from the first stage to the stop position; a sheet placed on the upper surface of sheet ejection dish 81 comes in contact with lower projection 81A, is arranged, and held securely. Thus, the sheet does not drop.

Figure 28:
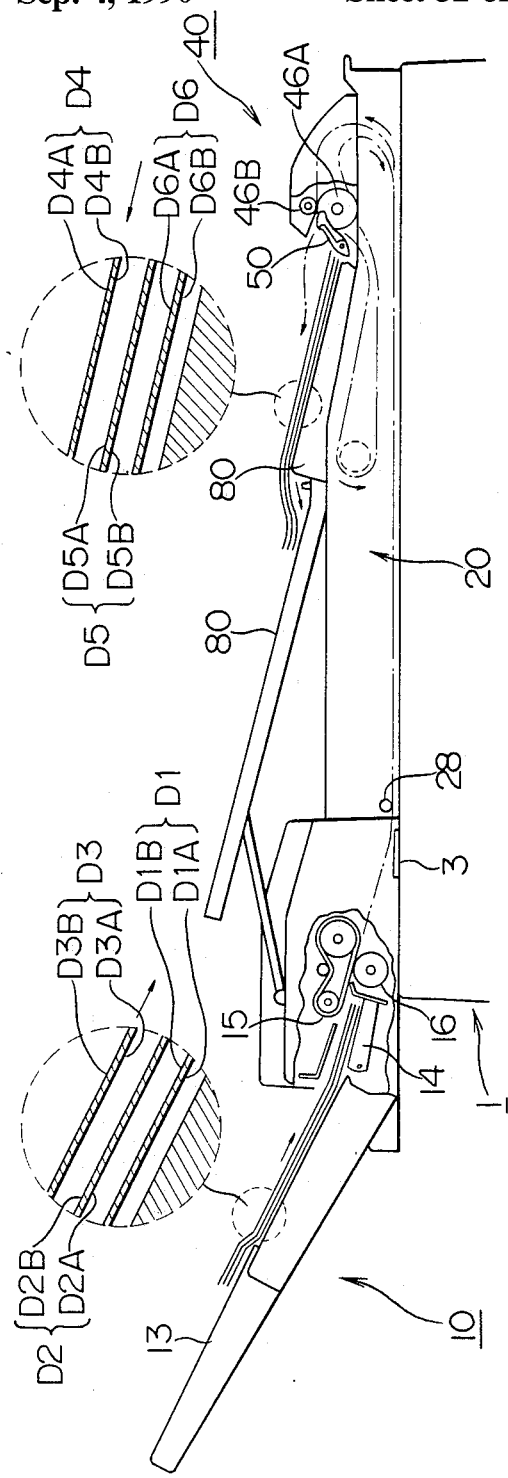
FIGS. 28 (A) and (B) provide a description of conveyance paths for one-side and both-side sheets.
Figure 28:
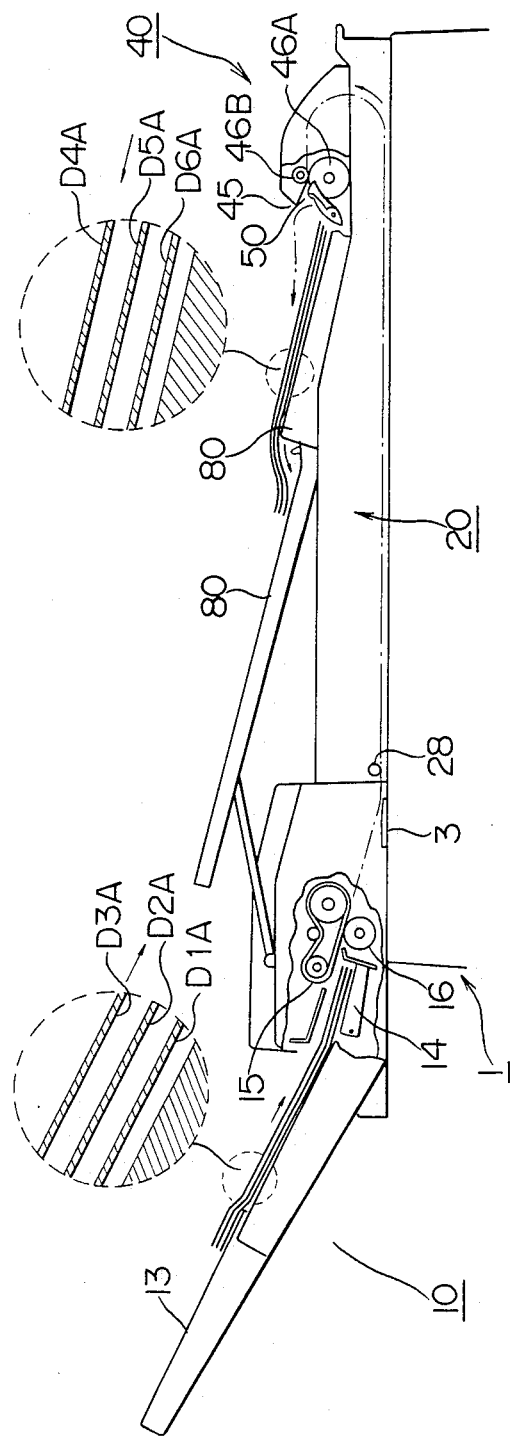

FIG. 28(A) indicates the route of sheet conveyance with a dashed line. In the conveyance apparatus, a pad of sheets D is placed on sheet support 13 of supply unit 10 with the surface (side A) D1A of the first sheet (D1) facing downward. Sheets D are supplied from the last page (e.g. D6), then firstly the surface of sheet D6 is inversed and the reverse surface D6B of sheet D6 is copied. Next, the obverse surface D6A of sheet D6 is copied after re-inversion, and sheet D6 is placed on ejection tray 80 with its surface D6A facing upward.

Subsequently, the next sheet D5 is conveyed and copied, and placed on sheet D6 on ejection tray 80.

All sheets copied are arranged and placed on ejection tray 80 with the obverse (D1A) of the first page (D1) facing upward.

The sheet conveyance apparatus of the present invention can be additionally set in the copy mode only for the one side. FIG. 28(B) indicates the sheet conveyance route in the mode, which is indicated by a dashed line. The area within a round broken line provides a partially expanded view for explaining sheet stacking.

A pad of sheets is placed on sheet support 13 of sheet supply unit with its first page (obverse) facing downward, is fed to conveyance unit 20 and then is ejected from sheet ejection and inversion unit 40 to ejection tray 80. Sheets D do not pass through inverting paths 43 and 44 and inversion and insertion path 42, but pass from feeding path 41 via a pair of sheet ejection rollers 46 and sheet ejection path 45 to ejection tray 80. Belt keep roller 28 located at the inlet section of conveyance unit 20 is not subjected to the control operation of rocking arm 30 by solenoid 35; roller 28 follows the forward and backward running of conveyor belt 21, and can be moved horizontally in both forward and backward direction along bearing element 29.

Sheet D conveyed to the right side (forward direction) on sheet glass 2 by conveyor belt 21, after its rear end has passed rear sheet end sensor 18 and stopper plate 3, overrun slightly and stopped. This is determined on the basis of count-up operation for clock pulses set in accordance with the length of a detected sheet size, after detecting the rear end signal generated by sensor 18.

At this stage, a motor M normal revolution drive signal is turned off and a reverse drive start signal is applied to the motor.

By the start of reversely driving motor M, conveyor belt 21 starts to reversely run, moving overrun sheet D to backward. After motor M has been revolved reversely by the number of given pulses, the rear end of sheet D comes in contact with step 3a of stopper plate 3, stopping the running of conveyor belt 21.

During the reverse running of conveyor belt 21, belt keep roller 28 that is on the condition capable of being moved through its shaft edge, as being turned to CW direction by the frictional tension of contacting conveyor belt 21, is moved to the left (backward direction), with its shaft edge 28a along the groove 29a of bearing element 29. When the roller surface of belt keep roller 28 is located above near step 3a of stopper 3, shaft edge 28a of belt keep roller 28 comes in contact with the left end surface of groove 29a of bearing element 29, being revolved by the belt conveyor. At the left edge position, belt keep roller 28 comes slightly in contact with step 3a of stopper plate 3 via conveyor belt 21, closing gap g.

At the side of step 3a of closing stopper 3, the top of sheet D reversely moved hits securely, and the stop of conveyor belt 21 causes sheet D to be placed correctly in the predetermined position. Sheet D is prevented completely from passing through the gap and entering sheet supply unit 10.

The sheet placed at the correct stop position is pressed against sheet glass 2 by conveyor belt 21 pressured by a plurality of pressing rollers 27S and 27B, with the surface A (obverse) so as to be exposed to light. Through the known process, formed images are transferred onto recording paper, copying of one surface is completed. In that case, the positions of images on recording paper and those of original pictures on the sheet are held correctly.

Sheet D whose surface A has been copied is moved on sheet glass 2 to the right by the normal running of conveyor belt 21, and fed into sheet ejection and inversion unit 40.

Sheet D enters feeding path 41 from the right edge of sheet glass 2 by conveyance force of conveyor belt 21, rises along feeding path 41, caught above pair of sheet ejection rollers 46, and ejected from sheet ejection path 45 to the outside. Sheet D is placed on ejection tray 80 with its surface A facing upward. Switching element 50 is lowered, enters among sheet ejection central roller 46A, and guides sheet D to the sheet ejection path.

The order of stacking sheets on sheet support 13 and the order of stacking sheets on ejection tray 80 are the same as in the above mentioned both surface copying mode.

The above explanation covers automatic inversion sheet conveyance apparatus (RADF) equipped with the sheet ejection and inversion unit that is capable of upsetting a sheet. Naturally, however, the present invention is also applicable to sheet conveyance apparatus (ADF) that ejects a sheet to the outside with the sheet upset.

The present invention provides sheet conveyance apparatus so configured that a sheet is introduced onto the sheet glass by means of the conveyor belt running positively and reversely thereon and then its end is caused to come in contact with the stepped stopper plate installed at the end of the sheet glass by reverse conveyance, wherein a belt keep roller is installed near the stepped stopper plate to make the roller movable and be hooked by a restricting means, and wherein a sheet can be fed from the sheet supply unit by forming a gap for sheet passing, reversely conveying the sheet from the sheet ejection unit, and closing the gap when the rear end of the sheet nears the stepped stopper plate, whereby the sheet can be positioned correctly and securely.

The belt keep roller of the present invention, which is supported irrespective of the drive roller like the past apparatus and timed separately for activation, provides various excellent effects including independence of relative conditions between the drive roller and the stepped stopper plate, and correct positioning.

The present invention unidirectionally turns sheet ejection and inverting rollers of the sheet ejection and inversion unit by utilizing the drive force of the conveyor belt of the sheet conveyance unit running positively and reversely, so that a sheet can be conveyed, inverted and ejected securely, leading to compact sheet conveyance apparatus having a simple structure. The resulting sheet conveyance apparatus is very inexpensive and does not get out of order under long-term severe conditions including repeated high-speed conveyance and inversion.

The automatic sheet conveyance apparatus provided by the present invention leads and feeds a sheet onto the sheet glass by means of the conveyor belt running positively and reversely to copy its both sides. When a sheet is fed onto the sheet glass by the reverse running of the conveyor belt from the inversion and insertion path, the electrostatically charged sheet is discharged by coming in contact with the de-energizing brush; so, the sheet is not offset on the sheet glass, and thus the sheet is conveyed properly and not broken, leading to enhanced copying accuracy and prevention of a sheet from being damaged. The automatic sheet conveyance apparatus of the present invention provides excellent effects in high-speed sheet conveyance and automatic sheet inversion.

In the automatic sheet conveyance apparatus provided by the present invention that leads a sheet onto the sheet glass by means of the conveyor belt running positively and reversely, for copying the sheet, the sheet inversion and conveyance section and the sheet ejection section are installed at the top of the sheet conveyance section above the sheet glass, whereby no special installation area is required, permitting the compact structure of the conveyance apparatus and providing excellent apparatus opening and closing operability. Further, the conveyance section can be opened and closed, permitting easily taking actions for jammed sheets and rapid and easy inspection.

As obvious from the above explanation, the present invention is characterized by the curved guide surface projected upward from the nip position of the turning sheet ejection roller and installed on the upper surface of the sheet ejection guide plate of the sheet conveyance switching element. A sheet to be ejected to the outside is provided with a curved wave-like surface, given increased force, and conveyed by sufficient conveyance force. Thus, a sheet is prevented from being jammed. Further, a sheet inverted and circulated is fed level from the sheet ejection roller and led into the inverting path along the lower curved surface of the switching element, so that the sheet is also held being level during reverse copying.

What is claimed is:

1. A sheet conveyance apparatus for conveying an original document sheet onto a platen glass through which the sheet is irradiated by light source to obtain an image light, said sheet conveyance apparatus having a one side mode for irradiating one side of said document sheet and a both side mode for irradiating both sides of said document sheet, said conveyance apparatus comprising:

cover means for covering the platen glass, said cover means including a unit housing pivotally mounted on said platen glass so that the bottom surface of said unit housing covers said platen glass;

conveyor means, disposed on the bottom surface of said unit housing, for loading the sheet onto said platen glass and discharging the sheet from said platen glass;

a delivery tray for receiving the irradiated sheet thereon;

a first passage including a path connecting said platen glass and said delivery tray so that through said first passage the sheet is loaded on said platen glass and is discharged to said delivery tray;

a second passage for reversing document sheets to be irradiated on both sides;

switching means for selecting said first passage or said second passage in accordance with the irradiation mode;

said second passage, being disposed between said conveyor means and the top surface of said unit housing, forming a loop passage and having an inversion roller so that through said second passage the sheet discharged from the platen glass is reversed and loaded again on the platen glass.

2. The apparatus of claim 1,
wherein said conveyor means includes a conveyor belt which is extended between first and second sides of said platen glass and has two moving directions consisting of first-moving direction moving from the first side to the second side and second-moving direction moving from the second side to the first side.

3. The apparatus of claim 2, wherein in the first-moving direction said conveyor means loads the sheet from the first side of the platen glass onto the platen glass and discharges the sheet from the second side of the platen glass.

4. The apparatus of claim 3,
wherein said delivery tray is mounted on the top surface of said unit housing.

5. The apparatus of claim 4,
wherein said path between the platen glass and said delivery tray comprises a first turning path connecting the second side of the platen glass and the delivery tray so that the irradiated surface of discharged sheets fed therethrough face upward on said delivery tray.

6. The apparatus of claim 5,
wherein a part of said first turning path is common to said second passage.

7. The apparatus of claim 6,
wherein on said first turning path there is provided a first branch point and a second branch point, between said first branch point and said second branch point there being provided a second turning path so as to form a loop passage of said second passage, on said second turning path there being provided an inversion roller so that the sheet discharged from said second side of said platen glass is returned by said inversion roller to said second side of the platen glass.

8. The apparatus of claim 7,
wherein at said first branch point are provided delivery rollers and said switch means for selecting one passage from the first and second passage,
wherein a downstream side of said switching means is integrated with a regulating plate for forming the sheet in a wave shape.

9. The apparatus of claim 7,
wherein a de-electrification brush is provided on said second turning path.

10. The sheet conveyance apparatus according to claim 7,
wherein said first turning path has an accessible path leading to said delivery tray, said accessible path being constructed in a cover configuration which covers said second turning path so that said second turning path can be accessed by opening said accessible path of said first turning passage.

11. The apparatus of claim 5,
wherein on said first turning path is provided a pair of delivery rollers in pressing contact with each other, and
a regulating plate for forming the sheet in a wave shape, said regulating plate being disposed at a downstream side in the conveying direction from the pressing contact position of said delivery rollers.

12. The apparatus of claim 3,
wherein a stop means is provided at the first side of said platen glass,
said conveyor means loading the sheet onto said platen glass through said first side over said stop means by moving said conveyor belt in the first-moving direction, said conveyor means then moving the fed sheet back to said stop means by moving said conveyor belt in the second-moving direction so that the sheet comes in contact with said stop means.

13. The sheet conveyance apparatus according to claim 12,
wherein in proximity to said stop means is provided a belt press roller capable of moving in accordance with the movement of said conveyor belt in the both moving directions, and
a restriction means capable of regulating said belt press roller at a predetermined position when said conveyor belt moves in the second-moving direction so that, when the sheet approaches said stop means, said belt press roller is released from the regulation of said restriction means, moves from the predetermined position and presses said conveyor belt into contact with said stop means.

14. The apparatus of claim 3,
wherein there is provided two driven rollers, in contact with said conveyor belt so as to be driven and transmit a driving force to said inversion roller through respective one-way clutches in which one of said one-way clutches is adapted to be operable during the first-moving direction and the other one is adapted to be operable during the second-moving direction so that both driven rollers transmit the driving force in the same direction.

* * * * *